US010175850B2

(12) United States Patent
Smith

(10) Patent No.: US 10,175,850 B2
(45) Date of Patent: Jan. 8, 2019

(54) SEARCH INQUIRY METHOD USING CONTEXTUAL ANNOTATION

(71) Applicant: Sharp Laboratories of America, Inc., Camas, WA (US)

(72) Inventor: Dana S. Smith, Dana Point, CA (US)

(73) Assignee: Sharp Laboratories of America, Camas, WA (US)

( * ) Notice: Subject to any disclaimer, the term of this patent is extended or adjusted under 35 U.S.C. 154(b) by 815 days.

(21) Appl. No.: 14/088,352

(22) Filed: Nov. 23, 2013

(65) Prior Publication Data
US 2015/0149428 A1 May 28, 2015

(51) Int. Cl.
*G06F 17/30* (2006.01)
*G06F 3/0482* (2013.01)

(52) U.S. Cl.
CPC ...... *G06F 3/0482* (2013.01); *G06F 17/30277* (2013.01); *G06F 17/30967* (2013.01); *G06F 17/30386* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 7,379,928 B2 | 5/2008 | Cukierman et al. | |
| 7,418,442 B1 | 8/2008 | Myhre | |
| 7,461,090 B2 | 12/2008 | Blinn et al. | |
| 7,711,732 B2 | 5/2010 | Pedersen | |
| 7,970,763 B2 | 6/2011 | Russo | |
| 8,005,850 B2 | 8/2011 | Walter et al. | |
| 8,743,051 B1* | 6/2014 | Moy | G09G 5/00 345/156 |
| 2002/0194200 A1 | 12/2002 | Flank et al. | |
| 2006/0050969 A1 | 3/2006 | Shilman et al. | |
| 2007/0196033 A1 | 8/2007 | Russo | |
| 2007/0271226 A1 | 11/2007 | Zhang et al. | |
| 2009/0024597 A1 | 1/2009 | Imielinski | |

(Continued)

FOREIGN PATENT DOCUMENTS

WO WO2010071617 6/2010

OTHER PUBLICATIONS

Gupta, Santini, and Jain, "In Search of Information in Visual Media", Comm. of the ACM, Dec. 1997/vol. 40, No. 12; pp. 40-42.

*Primary Examiner* — Rehana Perveen
*Assistant Examiner* — Raheem Hoffler
(74) *Attorney, Agent, or Firm* — Law Office of Gerald Maliszewski; Gerald Maliszewski

(57) ABSTRACT

A computer system and associated method are provided for formulating a search inquiry. A user interface (UI) accepts commands for selecting a first data object, and a display presents the first data object with a top plane as located within a geometric boundary representation of a virtual object-bearing front surface. The UI then accepts commands for selecting a first feature associated with the first data object. The UI next accepts either a flip object command or a flip surface command. In response to the flip command, the display presents a first data object bottom plane, opposite of the first data object top plane. The UI is then able to accept commands for selecting a second feature associated with the first data object, and construct a search inquiry in response to the first data object, the first feature, and the second feature, which is sent to a search engine.

30 Claims, 16 Drawing Sheets

(56) References Cited

U.S. PATENT DOCUMENTS

| | | |
|---|---|---|
| 2010/0100543 A1 | 4/2010 | Brady |
| 2012/0198545 A1* | 8/2012 | Keenan ................... G09G 5/14 726/18 |
| 2013/0031076 A1* | 1/2013 | Bhola ................. G06F 17/3066 707/706 |
| 2013/0110804 A1* | 5/2013 | Davis ............... G06F 17/30967 707/706 |
| 2014/0129990 A1* | 5/2014 | Xin ........................ G06F 3/017 715/849 |

\* cited by examiner

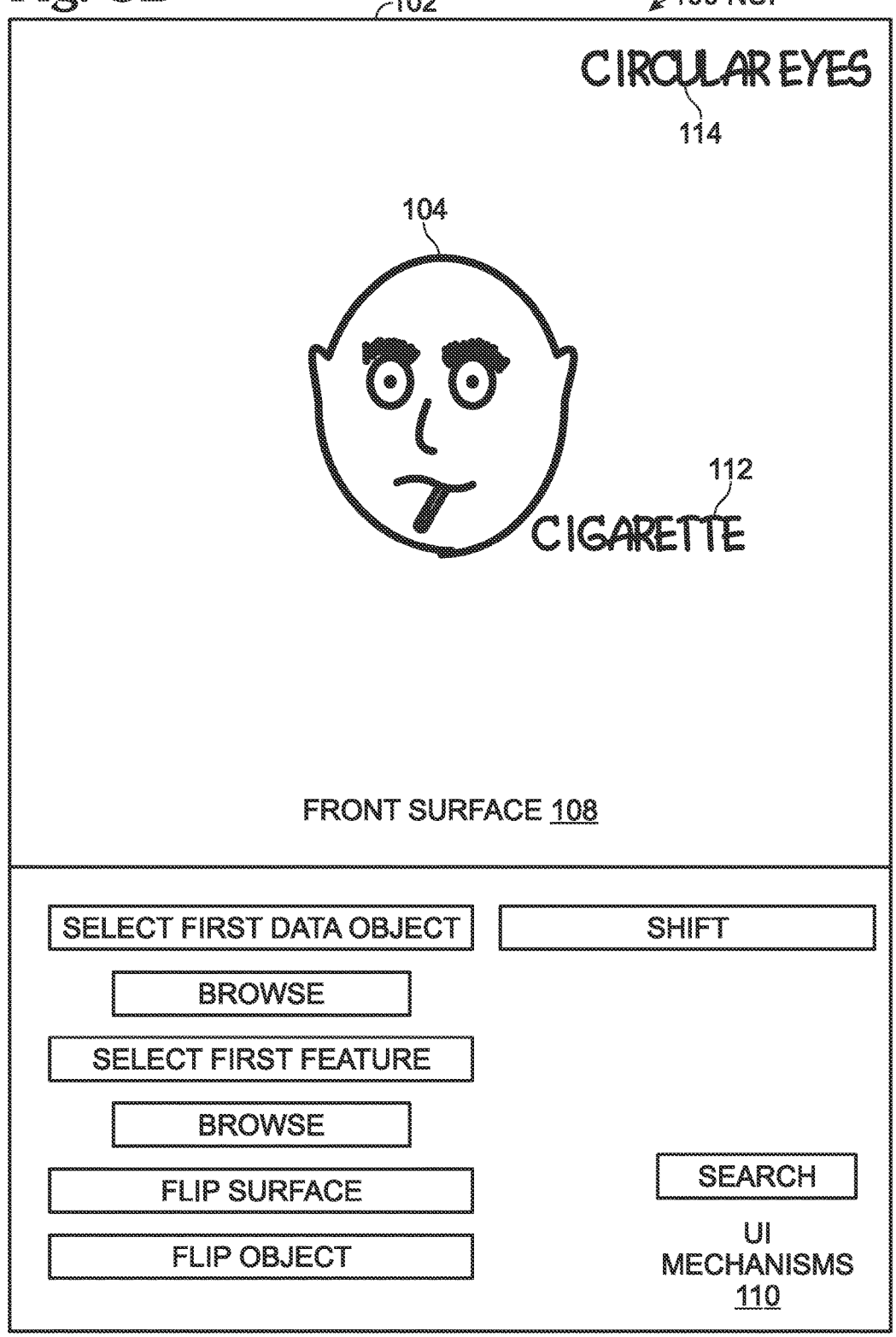

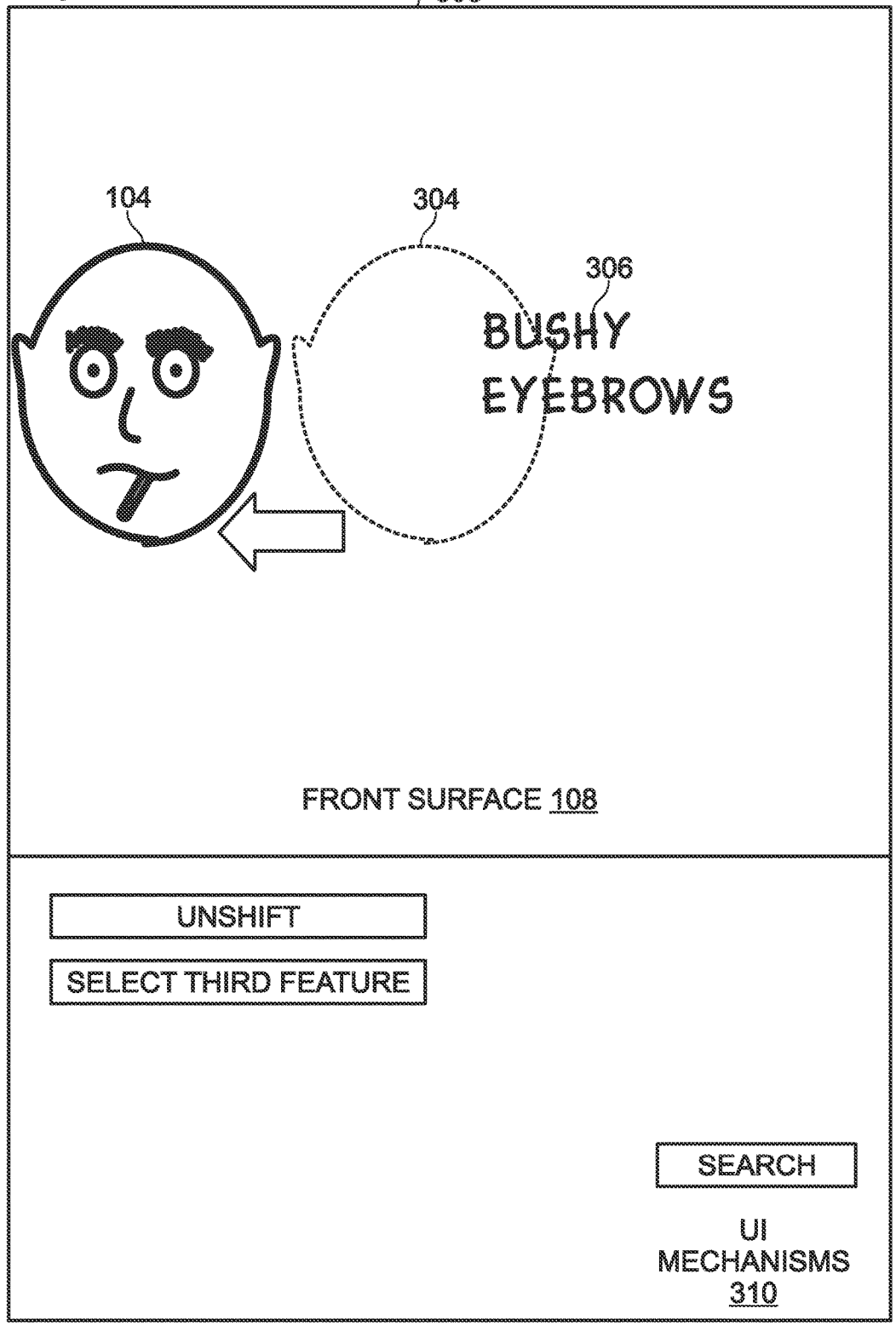

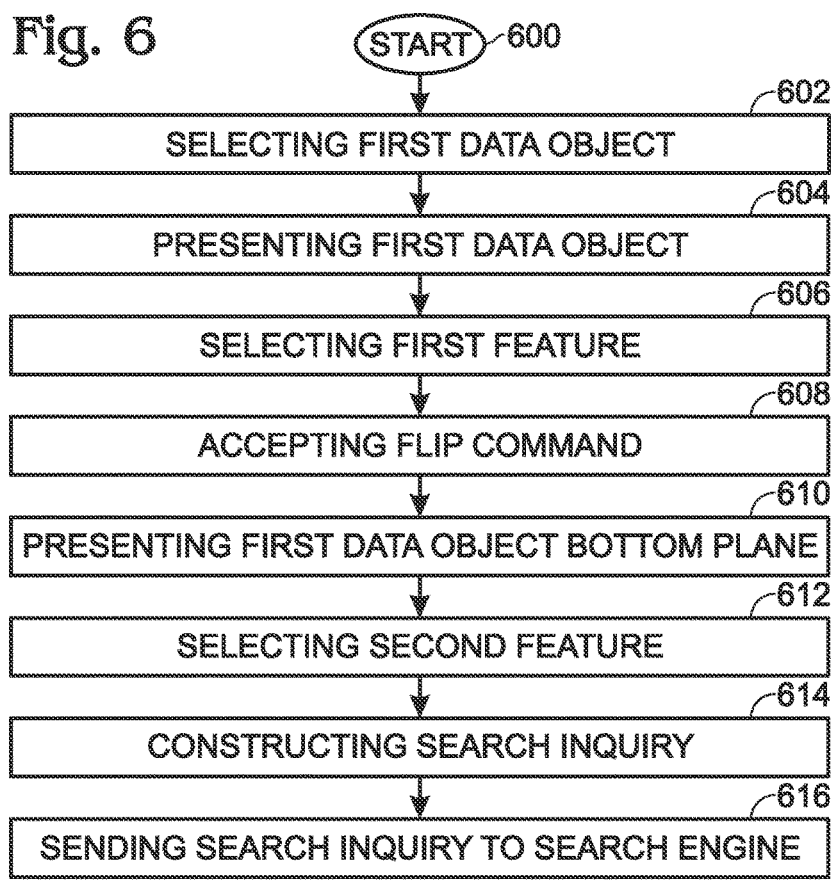
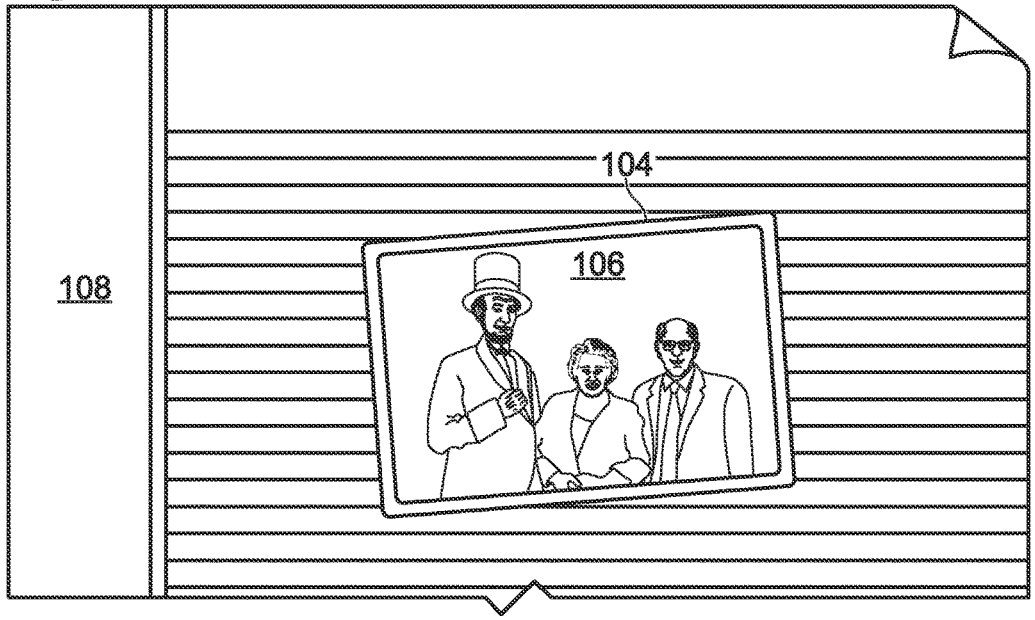

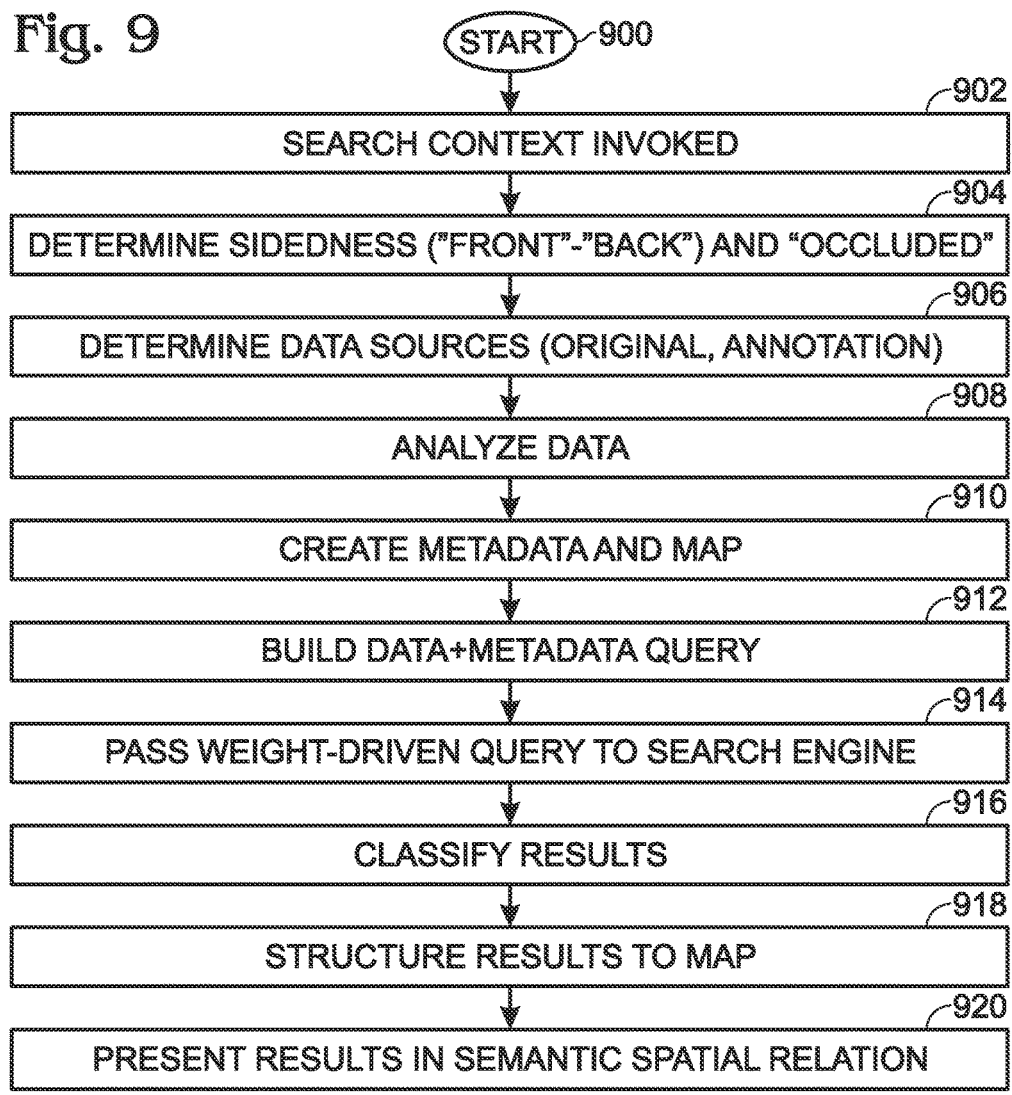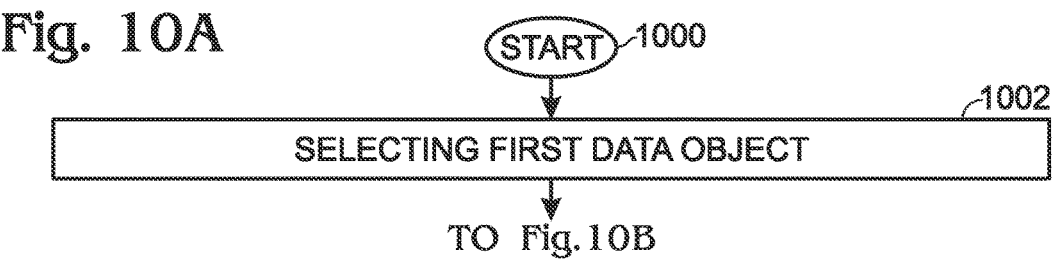

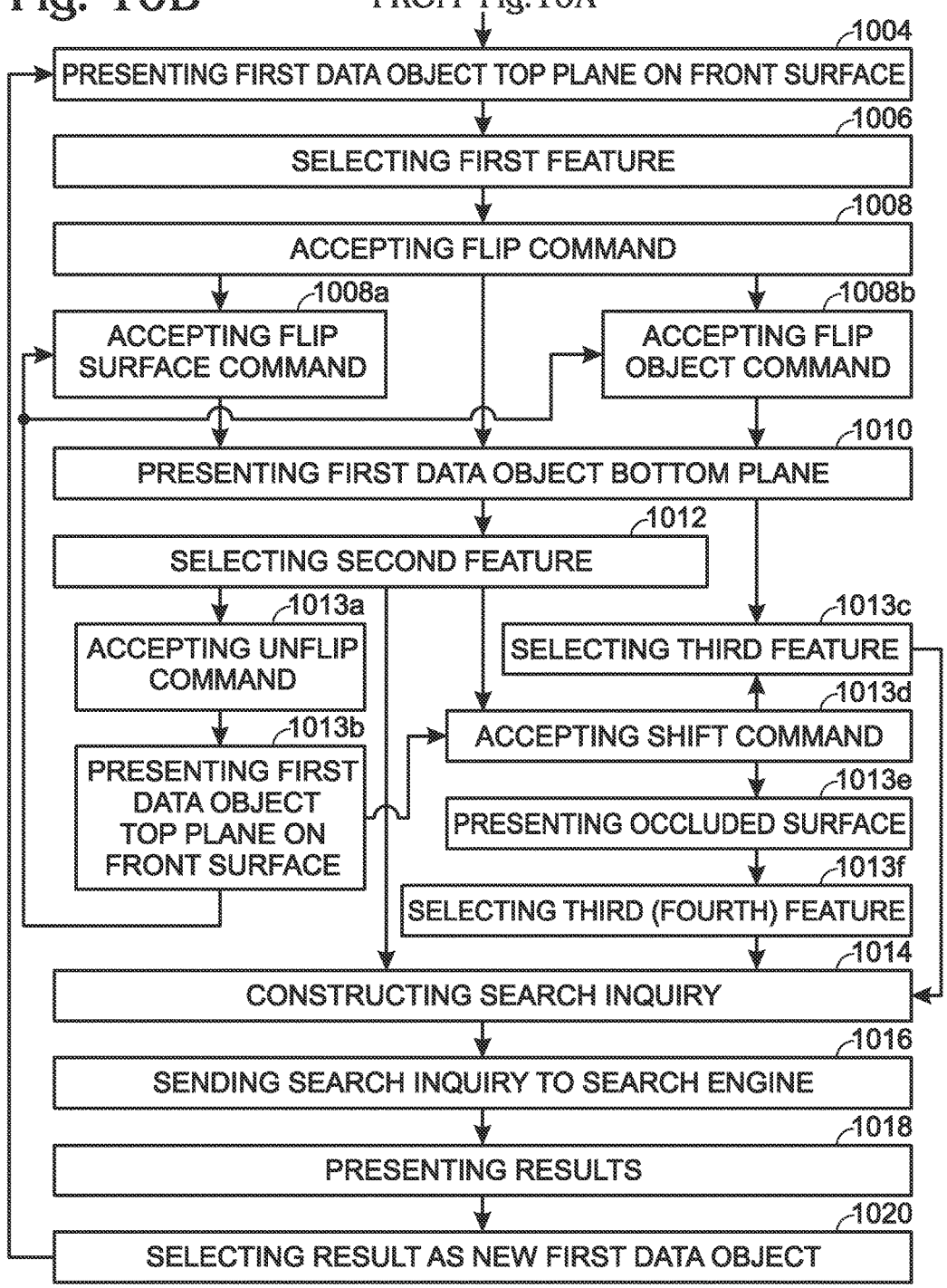

SEARCH INQUIRY METHOD USING CONTEXTUAL ANNOTATION

BACKGROUND OF THE INVENTION

1. Field of the Invention

This invention generally relates to a search inquiry method and, more particularly, to a system and method for contextually searching among a variety of computer data types, using attributes of a visual relationship between search components entered to direct the priority and ordering of a search inquiry submitted to a conventional search engine.

2. Description of the Related Art

Digital information is stored in a variety of locations, formats, and for an individual, is accumulated over a long period of time. A key area of computing, from both user and scientific perspective, is the ability to easily locate and retrieve desired information from a repository. Current technologies allow a number of ways to create search queries, refine results obtained by queries, and eventually succeed on retrieving desired content. However, the user interactions and user experience in conducting searches may be poor, time consuming, and frustrating—especially to non-technically inclined users.

The ability of a computer user to effectively and efficiently conduct a search for digital data materials of interest is limited by a number of factors. Most commonly, a search request involves keyboard entry of words or phrases which are used by a search engine to create links to digital content based on pattern matches or similar comparative criteria. The search engine reporting mechanism returns to the user an ordered list, typically where the first ordering is by 'relevance', meaning some quality metric has been applied to weight the ordering according to the number of matches to the request terms.

For search refinement, users may be requested or "walked through" creation of Boolean relational constructs which apply operators and ordering to constrain the search scope. For some types of digital data, such as images, a search may be conducted using the image or regions of the image as exemplary input criteria, and a search engine employs feature extraction and pattern matching on the image data. Images may include metadata such as date and time of acquisition, geolocation data, specifics of acquisition device, digital data format, and possibly keywords as linguistic tags of significance to the pictorial content (e.g., sunset, sailboat, bird, etc.).

To a naïve end user, it is bothersome to generate detailed Boolean algebraic relationships, but necessary due to the usually large number of matches to a brief search query entry of a few words, for example. Refinement of results is often directed—whether in relation to text-bearing content or image-bearing content—as a branching action, by selecting a particular result and an option to 'find more like this'. Considerable time must be spent in following a branch, and then if the inexact comparison methods provide poor result, additional time in stepping back to a superior branch point for further exploration.

It would be advantageous if a user could initiate a search using a simple and natural query approach, and likewise for refinement, be presented a rapid and intuitive method to narrow to desired outcome.

SUMMARY OF THE INVENTION

For a natural and fluid process of interaction with a computing device, such as a workstation or more particularly a tablet computer having an interactive display, and optionally a stylus for handwritten input, or optionally a virtual or physical keyboard for text and control input, a method is described that allows a user to conveniently accumulate data objects, such as images, documents, or created text either alone or preferably associated with other data objects. Within the context of accumulating these objects, a user may introduce order and significance to aspects of the accumulated objects so that a search engine may be preferentially disposed to weight, confine, or distribute both the mechanisms of search employed, and the ordering or cataloging of the results of the search provided to the user.

To accomplish these objectives, the method introduces the natural world object characteristics of "front" and "back" to information representation, where front implicitly connotes viewable, factual, and important, and where back implies subordination, not immediately viewable, and possibly less authentic. For example, a text or mixed content document may be presented to a user as a single-sided page. There may be a duplexed or double-sided aspect, but in electronic form this is practically reduced to the electronic display of the visible side of a page, and a page is 'turned' as if in a book to reveal the 'reverse' side of the sheet as the 'next page'. With the exception of actual two-sided electronic displays, where the first page may be shown on the one, and the second page (or backside of the first) is displayed upon the second display, a page which is conceptually on a sheet is always single-sided and viewed from the "front".

On a tablet display device, for example, a user might employ a stylus to make marks such as marginalia, underlining, circling, connection arrows and the like to call attention to specific content or relationships among content, or introduce words or phrases relevant to content. On a photographic image, for instance, the face of an individual might be encircled and a connecting line drawn terminating near handwritten text providing the name of the individual, e.g. "Bobby". This single-sided attribute can be extended to then allow a user to literally turn over that single-sided image and observe and interact with the "back" of it. Visually, the user sees a faint 'read-through' image of the content, in reverse, as if looking at a physical sheet of paper with printing on the opposite side. As with the front, a user may interact with this "back" side, and make written annotations, marks, and drawings. Continuing the photographic image instance from above, on the "back" of the photo a user might write a date and a location, e.g. "1962 Niagara Falls". The interaction is much as in the real world, where a physical photo might be marked upon, front and back.

Accordingly, a method is provided for formulating a search inquiry using a computer. A computer user interface (UI) accepts commands for selecting a first data object, and a computer display presents the first data object with a top plane as located within a geometric boundary representation of a virtual object-bearing front surface. The first data object may be a still image, video, text document, sound, or drawing. The computer UI then accepts commands for selecting a first feature associated with the first data object, such as accentuating a preexisting aspect of the first data object, adding video, text, sound, or a drawing, or editing a previously selected feature. The computer UI may then accept either a flip object command or a flip surface command. In response to the flip command, the computer display presents a first data object bottom plane, opposite of the first data object top plane. The computer UI is then able to accept commands for selecting a second feature associated with the first data object, and construct a search inquiry in response to the first data object, the first feature, and the second feature, which is sent to a search engine. In constructing the search inquiry, the first data object, first feature, and second feature are differentially weighted, typically based upon the surface or object plane being presented to the user when the search inquiry is initiated.

In the event of a flip surface command, a geometric boundary representation of a virtual object-bearing transparent back surface is presented, opposite of the front surface, through which the first data object bottom plane is visible. Commands for selecting the second feature associate the second feature with the first data object bottom plane. Alternatively, in the event of a flip object command, the first data object bottom plane is presented as it would appear overlying the front surface. Again, commands for selecting the second feature associate the second feature with the first data object bottom plane. In one aspect, the computer UI accepts a shift command for relocating the first data object on the front surface. In response to the shift command, the computer display presents a geometric boundary representation of a virtual object-bearing occluded surface underlying the first data object. Then, the computer UI is able to accept commands for adding a third feature, associated with the first data object, to the occluded surface, and the search inquiry can be constructing in response to the first data object, first feature, second feature, and third feature.

Additional details of the above-described method, a natural user interface (NUI), a non-transitory computer-readable media, and an electronic device for formulating a search inquiry are provided below.

BRIEF DESCRIPTION OF THE DRAWINGS

FIGS. 3A through 3C are depictions of a search inquiry NUI flip object menu and front page menu occluded surface feature.

FIG. 6 is a flowchart illustrating steps performed by the non-transitory computer-readable media of FIG. 5, for formulating a search inquiry comprising computer-readable instructions recorded thereon.

FIGS. 7A through 7M depict an exemplary process for preparing a search inquiry.

FIG. 9 is a flowchart illustrating steps in an exemplary search.

FIGS. 10A and 10B are flowcharts illustrating a method for formulating a search inquiry using a computer enabled with a sequence of processor executable instructions stored in a non-transitory medium.

DETAILED DESCRIPTION

Figure 1:
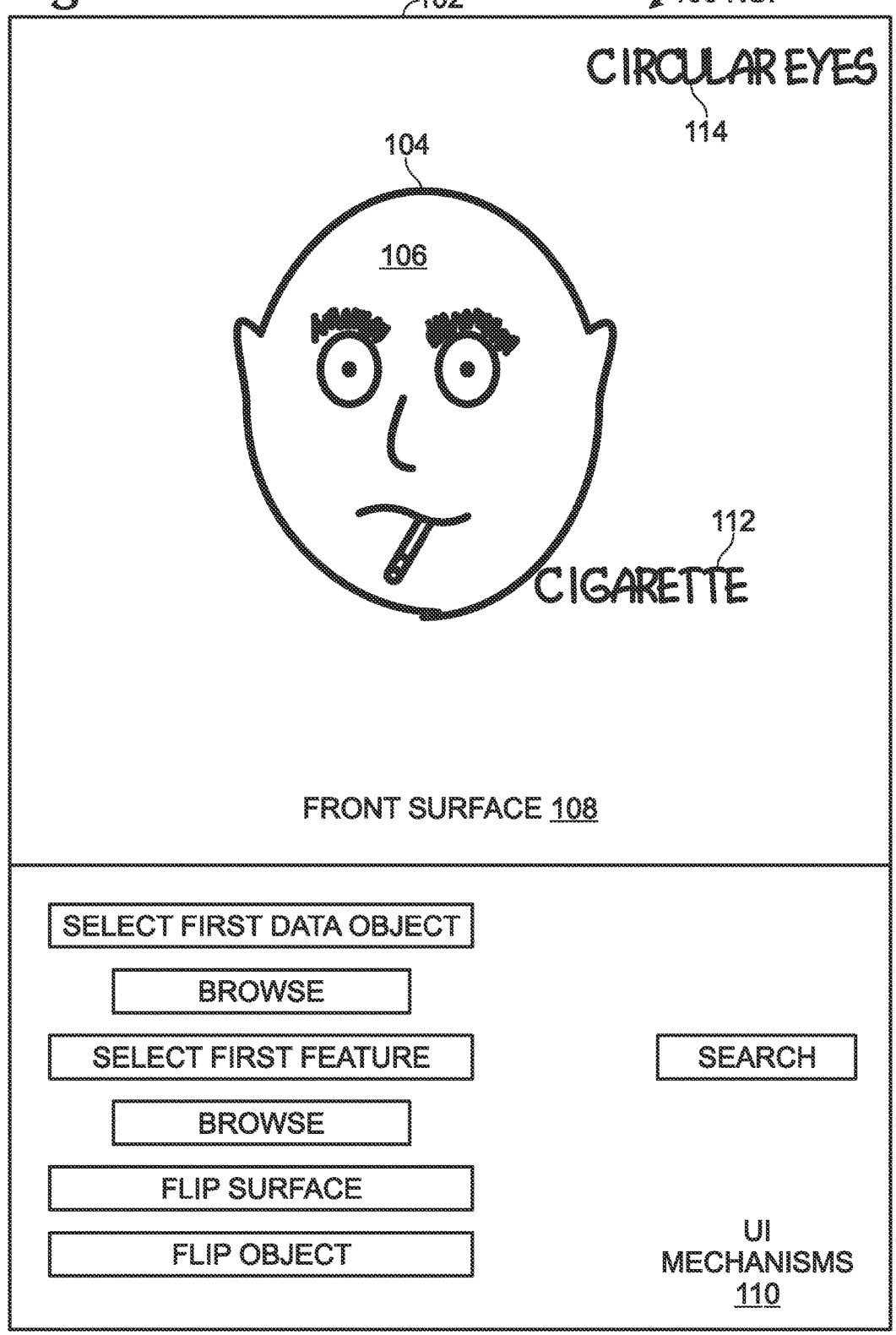
FIG. 1 is a depiction of a search inquiry Natural User Interface (NUI) front page.

FIG. 1 is a depiction of a search inquiry Natural User Interface (NUI) front page. The NUI 100 is enabled by a computer executing a sequence of processor instructions stored in a non-transitory medium. Details of the computer are presented in the description of FIG. 5 The NUI 100 comprises a front page menu 102 presenting a first data object 104 with a top plane 106 as located within a geo- metrical boundary representation of a virtual object-bearing front surface 108. Here, the first object 104 is shown as a cartoon-like head with a face as the top plane 106, located on a square front surface 108. As used herein, the phrase "geometric boundary representation of a virtual object-bearing surface" is intended to primarily be a viewpoint onto a surface, but does limit the surface to a particular geometric boundary. For example, an object-bearing surface may be an unbounded surface. Further, the object may completely cover the surface in some aspects, and in other aspects the object-bearing surface may extend beyond what is presented to the user via the NUI menu. For example, the use of arrows may indicate a portion of the surface not currently being represented by the NUI menu. Alternatively, the front surface can be rectangular, oval, triangular, etc. The surface area around the first object 104 is shown as a simple blank white region, however, other textures or colors may be used.

NUI goes beyond the graphical user interface (GUI) and WIMP (Windows, Icons, Menus, Pointers) approaches of the past. There are graphic components to NUI, but also mechanism specifics such as touch, stylus, gestures (by touch or stylus, or in-air like the MS Kinect). For example, NUI object selection is typically by touching, tapping, or touch and hold. Flipping might be user-cued with a visual such as a curly corner on an object, which if 'flicked', flips it over like flipping a playing card on a poker table. These same commands may be accomplished with a GUI with a menu of options, with 'flip over' or 'write on the back', etc. options.

The front page menu 102 provides user interface (UI) mechanisms 110, such as "buttons" or icons selected using a computer keyboard or mouse, for selecting the first data object. A number of means are known in the art for a user to make menu selections depicted on a computer screen, such as the NUI mechanisms mentioned above. However, for the sake of simplicity, the UI mechanisms are typically presented herein as GUI mechanisms. For example, UI mechanism 110 may permit the user to browse files stored in computer memory, and cut-and-paste the first object from the file onto the front surface 108. Otherwise, the UI mechanism 110 may permit the user to draw the cartoon-like head. The first data object may also be a preexisting still image, preexisting video, preexisting text document, or preexisting sound. As used herein, "preexisting" means that the user finds the first object already existing in some kind of electronic format, for example from a stored file or previous search inquiry. The first data object can also be user-added sounds, entered via a microphone for example, user-added images, entered by scanning or camera for example, user-added video, entered from a camera for example, user-added drawings or text, entered via a touch screen or scribe tool with electronic interface, or combinations of the above-listed elements. In one aspect, the front page menu first data object selection UI mechanism 110 may accept commands for selecting a plurality of first data objects, but in the interest of simplicity, only one is shown.

The UI mechanism 110 also permits the selection of a first feature 112 associated with the first data object 104. In this case, the first feature 112 is the text "cigarette", which is perhaps a well-known trait associated with the first data object. Generally, the first feature can be considered another data object that is combined with the first data object, or an accented feature of the first data object. More particularly, the first feature may be an accentuated preexisting aspect of the first data object (e.g., the cigarette is a preexisting part of the first image that is highlighted via UI mechanism 110), an added video, added text, image-associated sounds (preexisting with the first data object), added sounds, added drawings (e.g., the cigarette is drawn by the user via UI mechanism 110 after the first data object is selected), or a previously selected feature that has been edited. In one aspect, the front page menu first feature selection UI mechanism 110 may accept commands for selecting a plurality of first features associated with the first data object. In this example, a second first feature 114 is shown, which is the text "circular eyes".

The UI mechanism 110 can also initiate a search inquiry and accept a flip command. Again, it should be understood that although the UI mechanism has been depicted as a collection of buttons, for simplicity, the UI mechanism is not limited to may particular means and can be enabled via keyboard, mouse, stylus, hand movement, voice, touchscreen, fingertip (used as a writing instrument), or NUI mechanism. Note: although all the above-mentioned UI mechanisms are depicted as being presented simultaneously as buttons, in some aspects not shown, some of the UI mechanisms (e.g. buttons) may Only be presented to the user in sequence as a path, after the selection of an initial UI mechanism (button).

Figure 2:
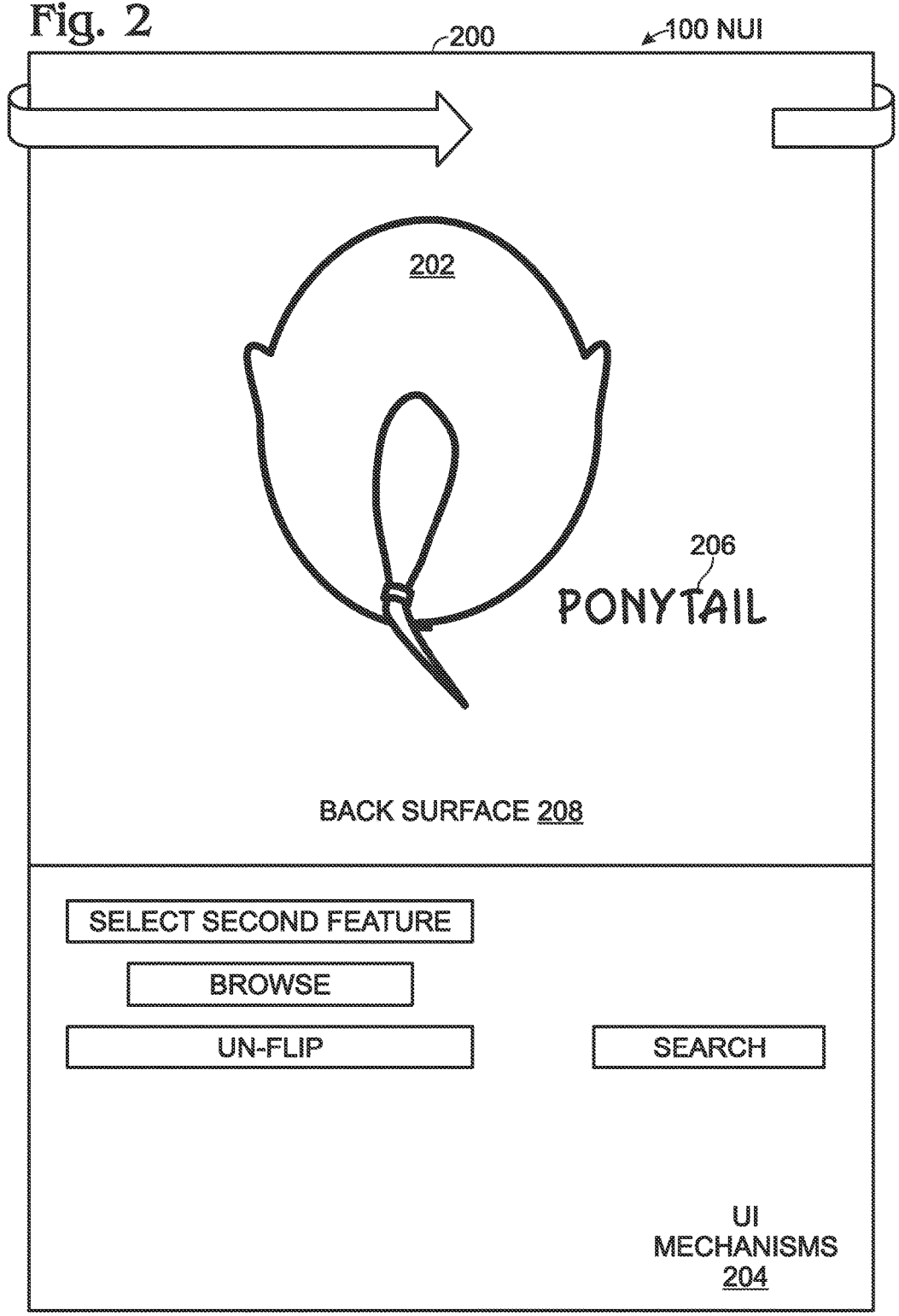
FIG. 2 is a depiction of the search inquiry NUI flip page menu.

FIG. 2 is a depiction of the search inquiry NUI flip page menu. In response to a flip command selected on the front page menu, a flip page menu is accessed that may be either a flip object menu, see FIG. 3A, or a flip surface menu 200, as shown. Either flip page menu presents a first data object bottom plane 202, opposite to the first data object top plane, and provides UI mechanisms 204 for selecting a second feature 206 associated with the first data object 104. The first data object bottom plane 202 is presented as a reversed first data object top plane, representing a two-dimensional first data top plane image as reversed from left to right.

In this case, the first data object bottom plane 202 depicts the back of the cartoon-like head selected as the first data object, and the second feature 206 is a pony tail. The second feature may be selected from the same group of elements as the first feature, listed above. The UI mechanism 204 can also be used for initiating a search inquiry and accepting an unflip command for returning to the front page menu.

More explicitly, the flip surface menu 200 presents a geometric boundary representation of a virtual object-bearing transparent back surface 208, opposite of the front surface, through which the first data object bottom plane 202 is visible. The flip surface menu UI mechanism 204 accepts commands for associating the second feature 206 with the first data object bottom plane 202.

Figure 3A:
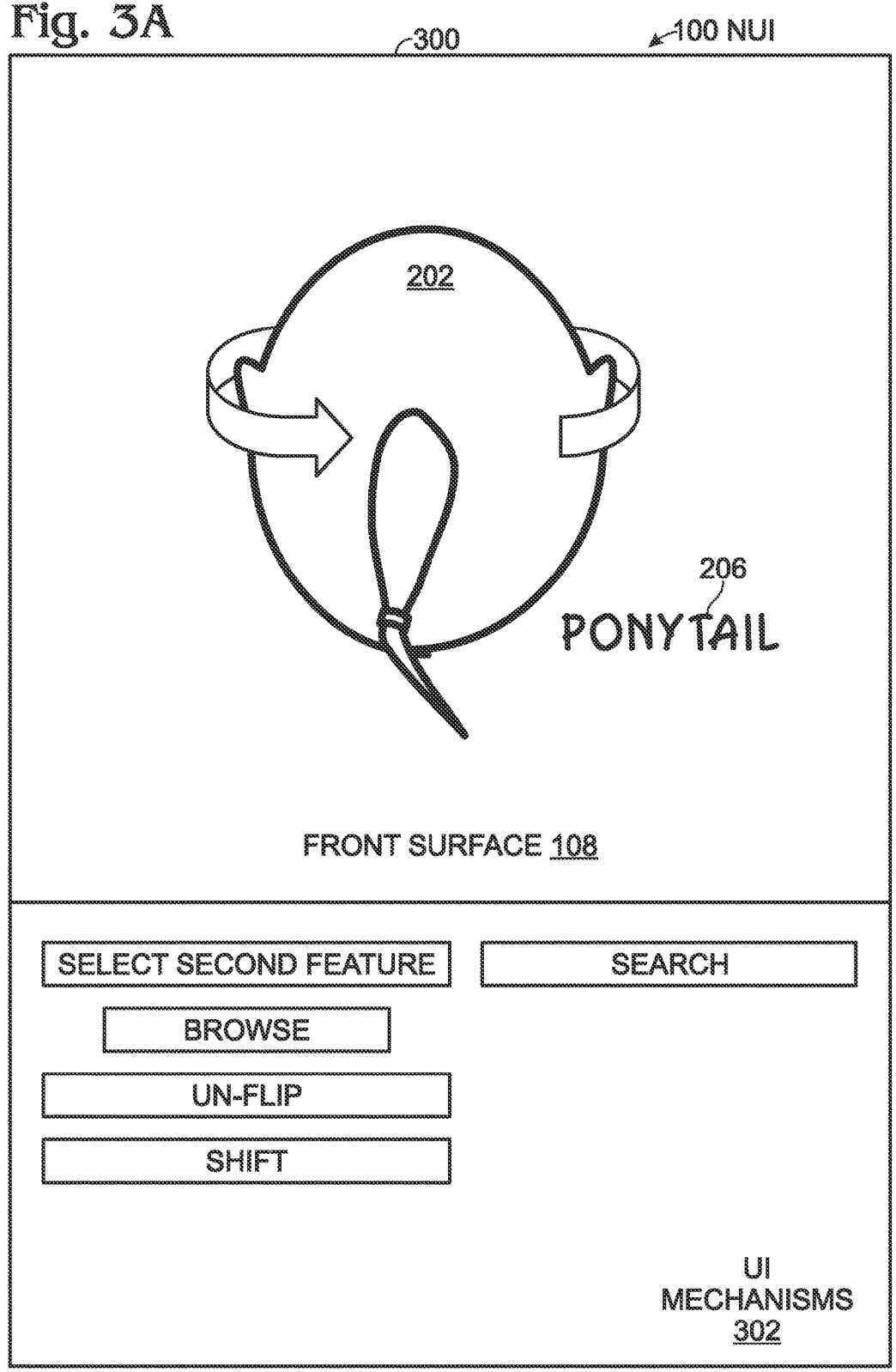

FIGS. 3A through 3C are depictions of a search inquiry NUI flip object menu and front page menu occluded surface feature. In FIG. 3A, the flip object menu 300 presents the first data object bottom plane 202 overlying the front surface 108. Flip object menu UI mechanism 302 accept commands for associating the second feature 206 with the first data object bottom plane 202. Note: the flip surface menu depicts the first data object bottom plane as located on a back surface (the front surface is flipped), while the flip object menu depicts the first data object bottom plane as located on the front surface (only the first data object has been flipped).

In FIG. 3B the front page menu UI mechanism 110 accepts shift commands to relocate the first data object 104 on the front surface 108 and present a geometric boundary representation of a virtual object-bearing occluded surface 304 underlying the first data object 104. Subsequent to shifting, in FIG. 3C the shift object menu UI mechanism 310, associated with the shift object menu 308, is then able to accept commands to add a third feature 306, associated with the first data object 104, to the occluded surface 304. In this example, the third feature is the text "bushy eyebrows". Then, the shift page menu search inquiry UI mechanism 310 can initiate a search inquiry in response to the first data object, first feature, second feature, and third feature. In another aspect, an "unshift" command returns the user to the menu from which they entered the shift object menu 308, and a search can be initiated this menu based upon the first, second, and third features.

Note: the first data object can be relocated to reveal an occluded surface, either prior to, or after engaging the flip surface or flip object menus. Also note: the first and second features are not depicted in the interest of clarity, but in other aspects they may be presented on the front surface along with the third feature. Finally, although the first data object top plane has been depicted as being relocated on the front surface, it should be understood that the first data object bottom plane may be shifted or relocated on the front surface in response to UI commands from the flip object menu (see FIG. 7J).

In one aspect, the front page menu presents the first data object top plane as located on the front surface in response to an unflip command accepted by the flip object menu. Then, a flip surface command can be entered via the front page menu UI mechanism 110, and then a flip surface menu selected, which presents the first data object back surface, through which the first data object bottom plane is visible, as explained in the description of FIG. 2. However, if the second feature was selected using the flip object menu (FIG. 3A), then in this aspect, the flip surface menu can be used to select a third feature associated with the first data object bottom surface. If a third feature has been selected for an occluded surface, then a fourth feature may be selected.

The front page and flip page menu search inquiry UI mechanisms initiate search inquiries by differentially weighting the first data object, first feature, and second feature. Search inquiries are initiated by weighting the first data object, first feature, and second feature based upon factors such as the surface being presented when the search inquiry is initiated, the object plane being presented when the search inquiry is initiated, and a spatial analysis of first and second feature locations with respect to the first data object location. If a third (and fourth) feature is selected, the first data object, first feature, second feature, and third (and fourth) feature are differentially weighted.

Figure 4:
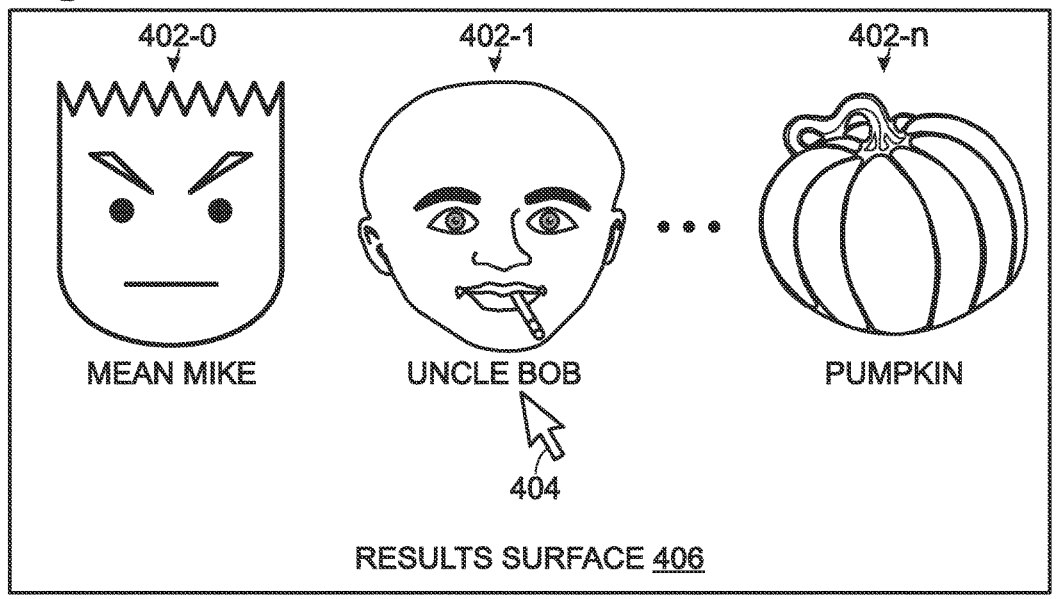
FIG. 4 depicts a search inquiry NUI results menu.

FIG. 4 depicts a search inquiry NUI results menu. The results menu 400 presents a plurality of result objects 402-0 through 402-n received in response to the search inquiry, where n is an integer not limited to any particular value. A results menu UI mechanism is able to select a first result object, from the plurality of result objects, as a new first data object. Here, result object 402-1 is shown being selected by a mouse cursor 404. Once the new first data object 402-1 is selected, then a new first feature can be selected as being associated with the new first data object, as explained in the description of FIG. 1.

In one aspect, the results menu 400 presents a results surface 406 with a plurality of result objects 402-0 through 402-n, where the relevance of the first result object 402-0 is related to spatial location on the results surface 406 and responsive to the spatial location of the first feature with respect to the first data object. Likewise, the relevance of the second result object 402-1 is related to spatial location on the results surface 406 and responsive to the spatial location of the second feature with respect to the first data object. For example, the relevance of the spatial location on the results surface may be responsive to the distance from the center of the results surface. Returning briefly to FIG. 1, the highlighted "cigarette" text 112 may have more relevance than the "circular eyes" text 114, since it is closer to the first data object 104.

Figure 5:
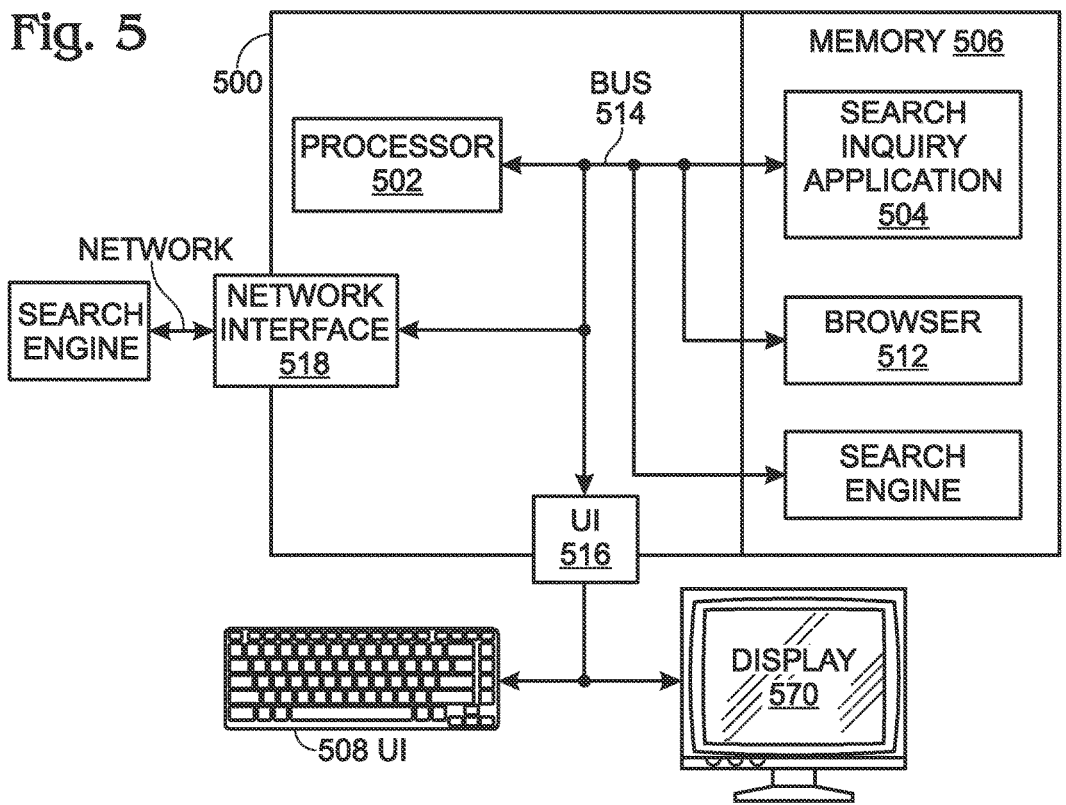
FIG. 5 is a schematic block diagram of an electronic device for formulating a search inquiry.

FIG. 5 is a schematic block diagram of an electronic device for formulating a search inquiry. The electronic device 500 comprises a processor 502, and a search inquiry application 504 enabled with a sequence of processor executable instructions stored in a non-transitory medium (i.e. memory) 506. The processor 502 is connected to the memory 506 via a data/address bus 514. The electronic device 500 further comprises a user interface (UI) 508 for accepting UI commands. Here, the UI is depicted as a keyboard for simplicity, but it could alternatively be a camera to accept gesture commands, a microphone to accept audio commands, a touchscreen, a stylus with an electrical interface, a mouse, or a combination of the above-mentioned UI means. The electronic device 500 has a display or monitor 510. The display 510 and UI 508 are connected to bus 514 via an input/output (IO) interface 516. The search inquiry application 504 accepts UI commands for selecting a first data object, and in response, sends commands to the display 510 for presenting the first data object with a top plane as located within a geometric boundary representation of a virtual object-bearing front surface. The search inquiry application 504 also accepts UI commands for selecting a first feature associated with the first data object, and a UI flip command, either a flip object command or a flip surface command. The first data object, top plane, front surface, first feature and UI flip command are described in the explanation of FIG. 1.

In response to accepting the UI flip commands, the search inquiry application sends commands to the display 510 for presenting a first data object bottom plane, opposite of the first data object top plane. Then, the search inquiry application 504 accepts UI commands for selecting a second feature associated with the first data object. The first data object bottom plane and second feature are described in the explanations of FIGS. 2 and 3A. The search inquiry application 504 then constructs a search inquiry in response to the first data object, the first feature, and the second feature, and sends the search inquiry to a search engine. For the sake of simplicity, only a search inquiry application is shown, which is assumed to be capable of performing functions associated with the operating system, display driver, as well as communicating with an Internet browser 512, such as Google Chrome and MS Internet Explorer, and a network interface 518, for the purpose of submitting a search inquiry to a search engine. Further, the search engine need not necessarily be on a network or connected to the Internet, but alternatively, may reside within the system device 500. For example, the system may be applied to database queries within an enterprise, using a search engine able to support such a query type.

FIG. 6 is a flowchart illustrating steps performed by the non-transitory computer-readable media of FIG. 5, for formulating a search inquiry comprising computer-readable instructions recorded thereon. The memory may include a main memory, a read only memory, and mass storage devices such as various disk drives, tape drives, etc. The types of appropriate memory types typically include dynamic random access memory (DRAM), and high-speed cache memory, magnetic disk, tape drives, optical disk drives, or various portable media, such as a floppy disk, a compact disc read only memory (CD-ROM), or an integrated circuit non-volatile memory adapter (i.e. PC-MCIA adapter). The instructions begin at Step 600.

Step 602 accepts UI commands for selecting a first data object. Step 604 presents the first data object (i.e. send commands to a display) with a top plane as located within a geometric boundary representation of a virtual object-bearing front surface. Step 606 accepts UI commands for selecting a first feature associated with the first data object. Step 608 accepts a UI flip command—either a flip object command or a flip surface command. In response to the flip command, Step 610 presents a first data object bottom plane (i.e. sends commands to the display), opposite of the first data object top plane. Step 612 accepts UI commands for selecting a second feature associated with the first data object. Step 614 constructs a search inquiry in response to the first data object, the first feature, and the second feature. Step 616 sends the search inquiry to a search engine. Additional details of the instructions can be found in the method explained in FIG. 10.

Returning to FIG. 1, the contextual aspect of markings on top of an image is used to imply informational priority. If the initial content (first data object) is image, encircling a region (selecting a first feature) is interpreted as giving it added weight. Connecting annotated writing associates a secondary label (an additional first feature) to this image region. Use of the back plane of the image adds the labeling of additional writing (second feature) of tertiary significance, and the written ordering (spatially and temporally, if available) may also be parsed to provide a numeric value and words. If a search is associated with a marked photo, a first result might be images that contain content that closely matches the encircled face, that have the text label "Bobby" associated, and preferentially the number "1962" and labeling "Niagara Falls". Also, layout analysis enables weighting markings by connectedness, proximity, and other saliency measures derived from spatial and scale features.

Similarly, a portion of content which is a text document clipping (first data object) might be "turned over" and annotated with an image and handwritten text as "on the back" annotations. In this way the document or page or window of content becomes data rich and invites exploration to discover an added dimension of information. Optionally, a visible cue might be added on or adjacent to content which is so annotated, to indicate to a user that additional material is available on various pieces of content.

Further, when "turned over" and moved, a tertiary "occluded" region comprising the bounding box of the "back" view content is available for annotation as well, with reduced weighting due to the third position. Annotation objects can also be repositioned across "front", "back", and "occluded" views to modify the weights, or to be on, near, or far from content features to indicate weighting preference.

Additionally, the method continues with refinement techniques for the user which are also easy to understand and which assist in rapid convergence on the information of interest. Results may be graphically displayed to users in a 3×3, 5×5, or 9×9 layout, with the most relevant result in the center. Refinement direction, or refinement in search topology, is selected by marking a check (or tap) on the results moving in the direction of desired convergence. Results can be shown with varying weights applied the front, back, and combined criteria. Corner cases attempt to filter contradictory or ambiguous search components as refinement progresses.

The layout of returned results can be predicated on the relevance metrics. So if there are 4 results, one of high significance, 2 of lower but equal significance, and a 4th representing the first of many at a larger distance, the layout can be a rhombus if the presentation manager (PM) so decides that such a presentation conveys better meaning to the user. The PM establishes a spatial layout where the position and spacing has implicit significance to the user.

Some key points of interest are that the expansion of viewable content on a conceptual page or window, which maintains context by local graphical manipulation of "front", "back", "and occluded" views of such content, reveals added related content (text, handwriting, drawings, and images) as annotations. The virtual "back" or "occluded region" of any displayed content are used as subordinated metadata associated with the displayed content "front". The association of "front", "back", and "occluded" content annotation is based on spatial co-location on the corresponding surfaces. A semantic interpretation of search weights may be based on an annotation layout analysis on both "front" and "back" surfaces and optional "occluded" surface regions. Digital ink (electronic stylus) gestures may be used on search result variants to refine search.

The above-described NUI and computer system permit a user to more intuitively interact with a search engine invoking an analysis of the relationship between search terms, outside the scope of strictly language text, to more meaningfully structure and weight the terms for a search inquiry to be performed by a conventional search engine. As noted above, "back of page" is also a separate virtual surface, distinct from the "back of object" and "object occluded" surfaces. As such, it is also annotatable, and in this context might be yet another source of relational information about objects. Using the "back of page" connotes salience regarding the group of objects on the "front of page". In a photo-album metaphor, objects have the three individual surfaces on a per-object basis, and the spatial component of the front surface which can include associated information (the relationship of all—content not just marks or other annotations directly applied on an object) is considered. A caption appearing near content is associated with the content, so titles and captions are presumably matched to the right objects. One could annotate the "back of page" with a group property or observation (e.g., "all destroyed in the 1906 earthquake"). On the other hand, something important about a group isn't likely to be relegated to the back by a real user, so the implied ordering utilized in the system could work against the user's mental model of what matters more.

Figure 7B:
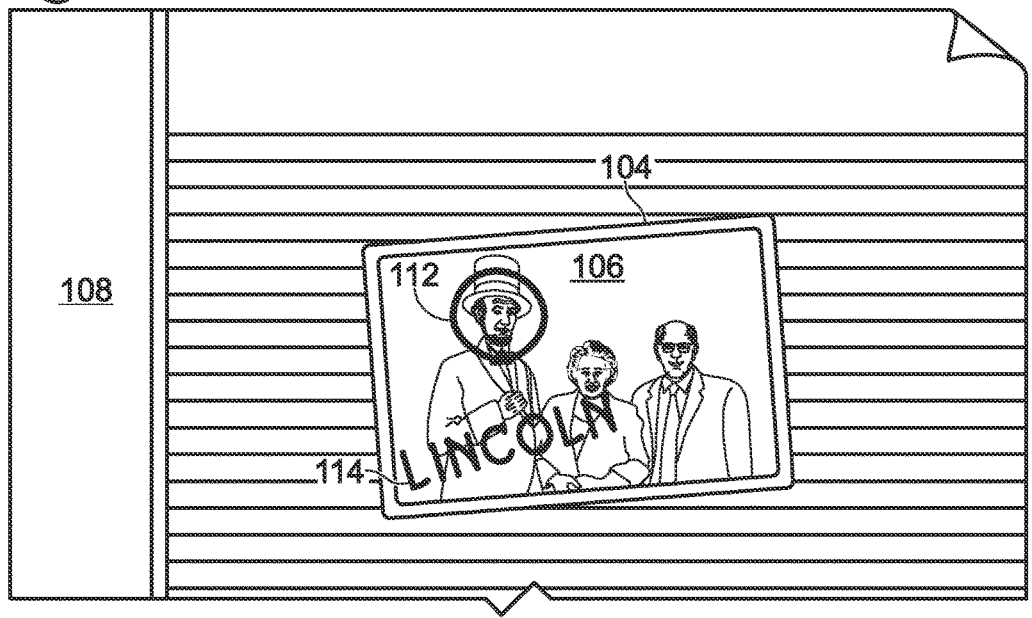

FIGS. 7A through 7M depict an exemplary process for preparing a search inquiry. In some manner as determined by a user interface, a page or window (front surface 108) is presented, as shown in FIG. 7A, into which or upon which a user may interact with visual information, using touch and optionally a stylus or virtual keyboard to assist in creating text. In this example, the representation of a page is displayed. The user has placed a digital photographic image (first data object 104 top plane 106) on the page. In FIG. 7B, one of the faces is encircled (first feature 112), and writing (additional first feature 114) is added to the image 104.

Figure 7C:
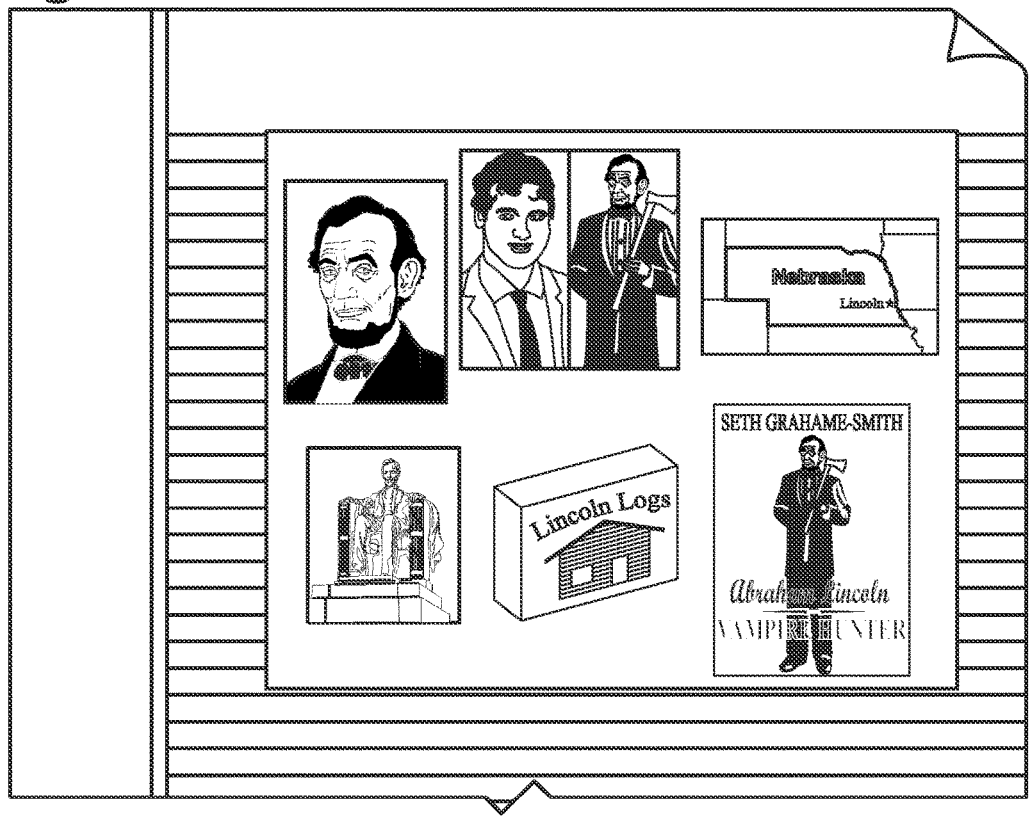

If a search function is invoked at this point, by some gesture or button, the results might be returned in a manner shown in FIG. 7C. Because the search criteria contained image—the encircled face component—and text, the written word "Lincoln", the results are organized with the photo closely matching the image search component in the center (Abraham Lincoln in a top hat—a text tag may be assumed associated with the image database). The circle was above the writing, an implicit emphasis on the image. Since text was also present, results that emphasize the text matches are included. When only a few criteria are indicated, it is possible, as in this case, to organize the result spatially in a layout derived from the way the criteria are positioned. So here, purely image results are above and towards the left, increasingly textual below and right.

Figure 7D:
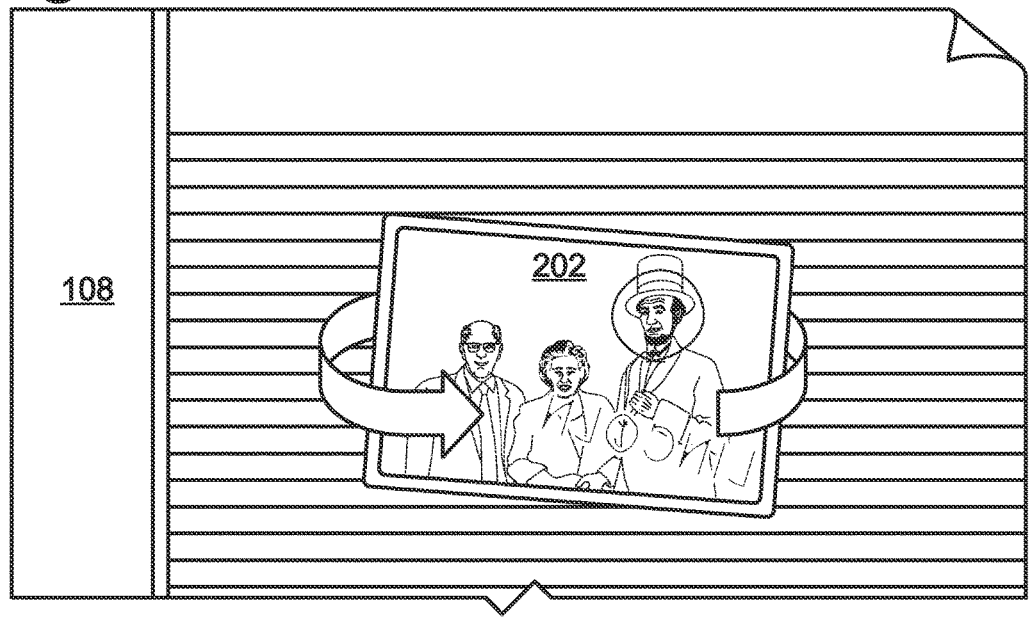
Figure 7E:
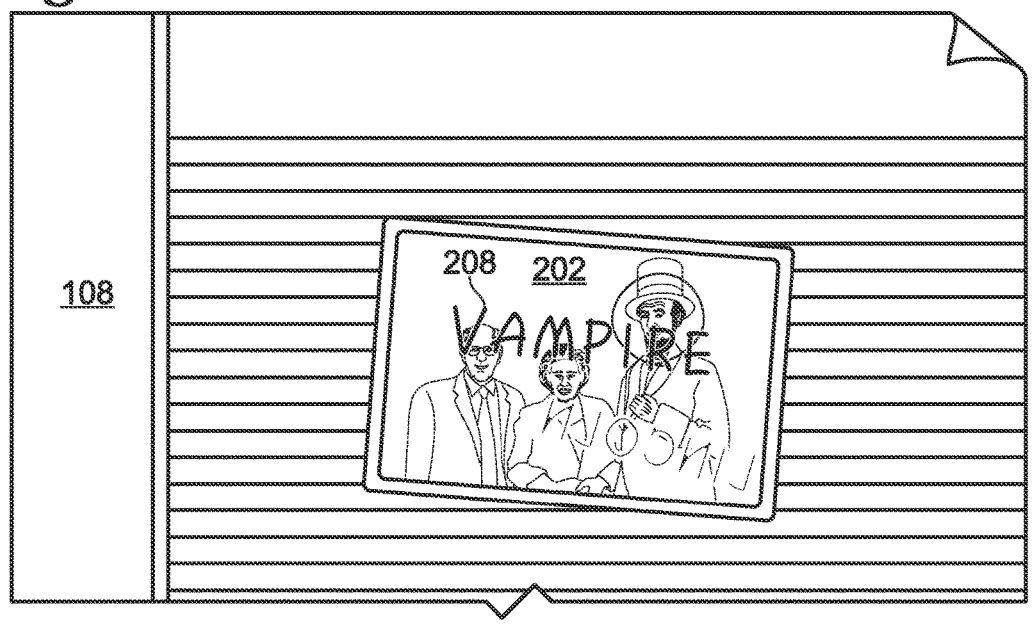

As shown in FIG. 7D, further refinement is possible by "turning over" the search query, using the flip object command, and accessing the virtual "back" (first data object bottom plane 202) by use of one of many possible practical gestures or user interface controls. As illustrated, the previous image content has been left-right reversed and depicted as if the top plane can be read-through faintly. Also in this depiction, the position or orientation of the first data image with respect the front surface 108 remains fixed. Alternatively, if a flip surface command had been used, the position or orientation of the first data image may be mirror-image flipped, as if seen through a back surface. Using either flip mechanism, at this point the user is cued visually that they are interacting with the "back", and can augment the metadata by now writing "on the back" (or adding another image or other data to be associated, and in particular associated in an informational or search criteria sense). In this case, the user adds additional text (second feature 206) "on the back", as shown in FIG. 7E.

Figure 7F:
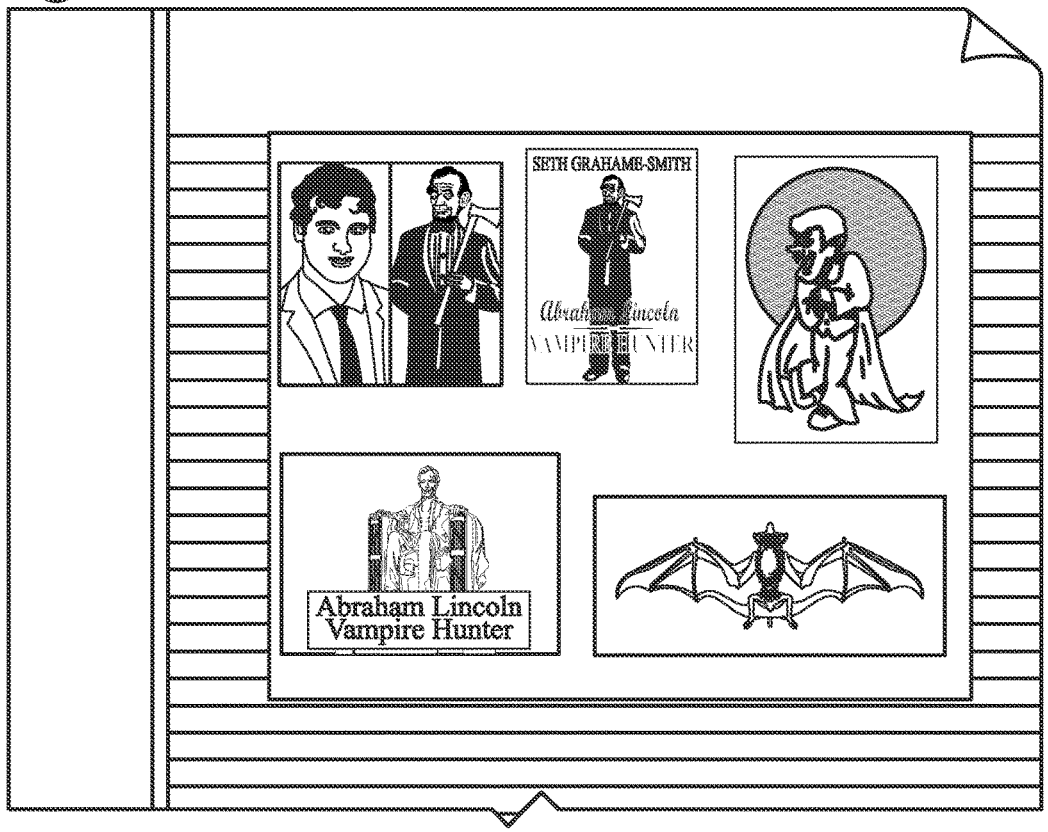

If a search is invoked at this point, while viewing the "back", the new text criteria (208) may be higher in priority than the "front" content of selected image region and text. This is natural—the current view is the foreground and of interest, so the content is weighted as such. The previous markups (first features 112 and 114, see FIG. 7B) are subordinated, but not eliminated, as search criteria. Alternatively, the order in which the features are selected may determine priority. Search result organization as shown in FIG. 7F now places a primarily text result as most likely in center position, variants of text with the now-subordinate face image and "Lincoln" up and left, and less coupled results to below and right.

Figure 7G:
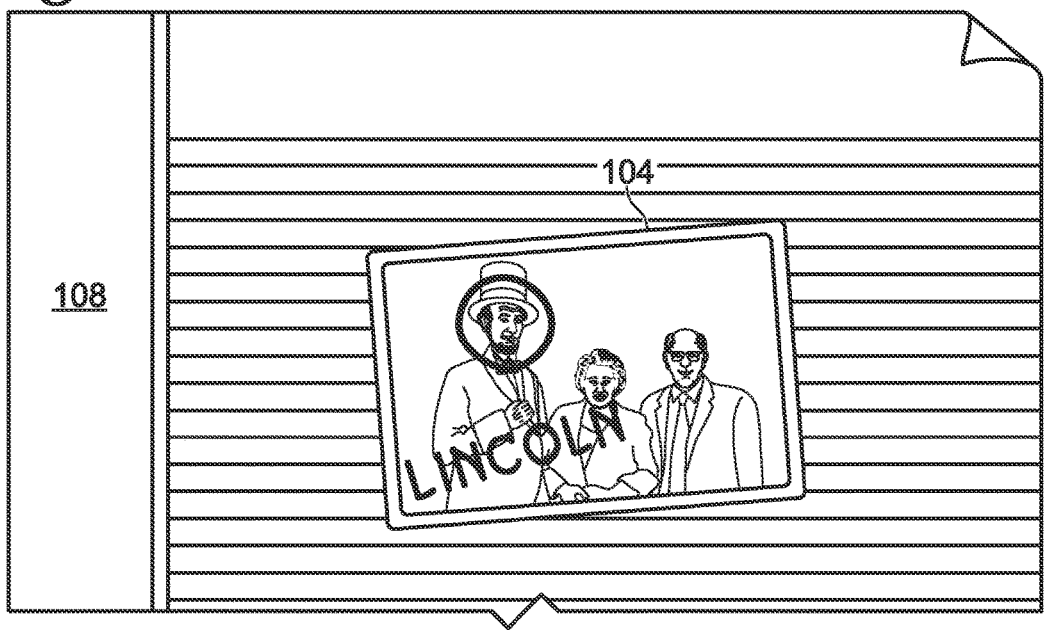
Figure 7H:
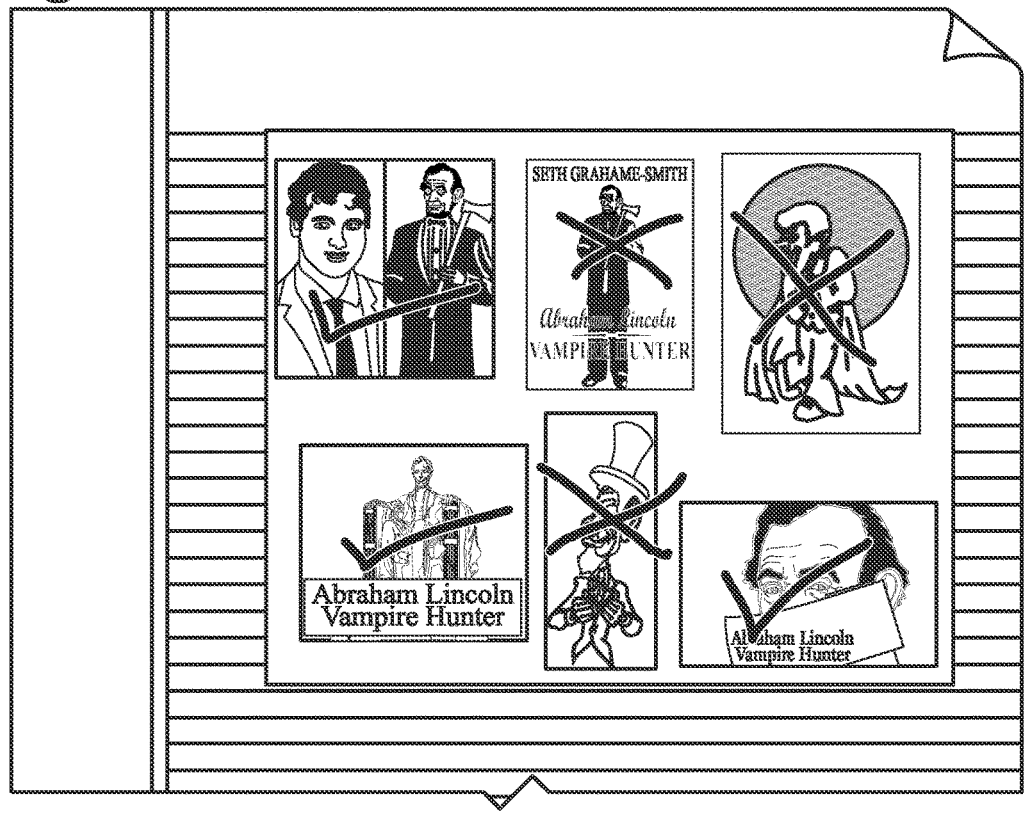

FIG. 7G depicts the "front" view restored with some complementary gesture or invocation (unflip command), with the previous content state visible. The content or markings on the "back" can be made visible (not shown) as a read-through image or not, as a user preference. Making it visible, or adding a visual cue of some sort such as a tab or other device, is useful to alert the user that there is content on the "back", as this can influence the search behavior (or other utilizations of data with metadata).

If search is again invoked with this new condition of content having both a "front" and "back", the derived search criteria and weighting place the encircled image, front text, and now rear text as query components with a similarly ordered weighting. These search results, as depicted in FIG. 7H, are again based on queries with the weights applied, and the most likely or best match places the Lincoln as vampire hunter in the center, as the result has high matches to the indicated image and both text query components.

At this point further refinement can be done with markings on the search results directly. The user may easily indicate "include" and "exclude" with checkmarks or "Xs" or other defined refinement gestures that are more natural to end users to narrow results. Additionally, other annotation, such as phrases, e.g. "no", "not this", "more like this", etc. can further direct search criteria refinement.

In this manner a user can quickly arrive at an intended inquiry result images related to the movie version of "Abraham Lincoln —Vampire Hunter" in a natural and rapid manner. For many, this is likely to be preferable and more easily understood than creating a possibly more efficient, but arcane, construct as "((Lincoln AND vampire) AND hunter) AND (NOT (book OR historic)), or other technically-oriented approach.

Figure 7I:
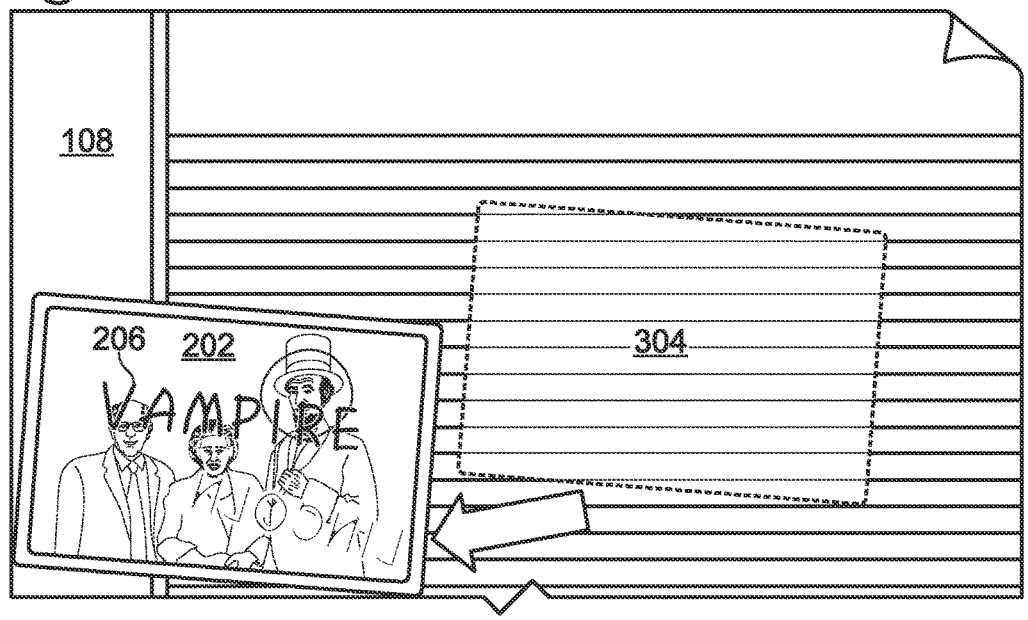
Figure 7J:
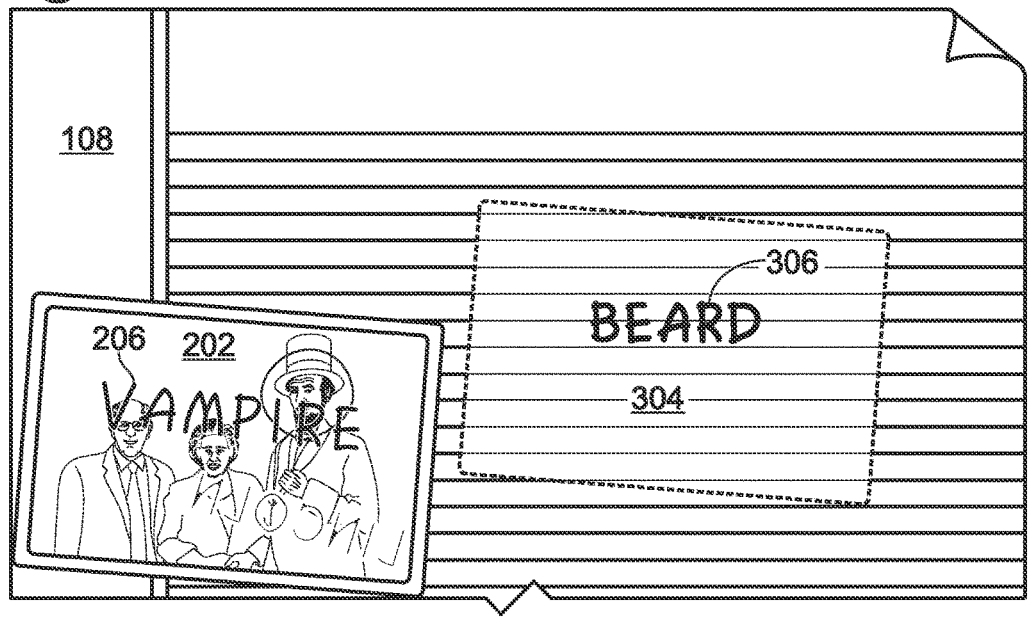
Figure 7K:
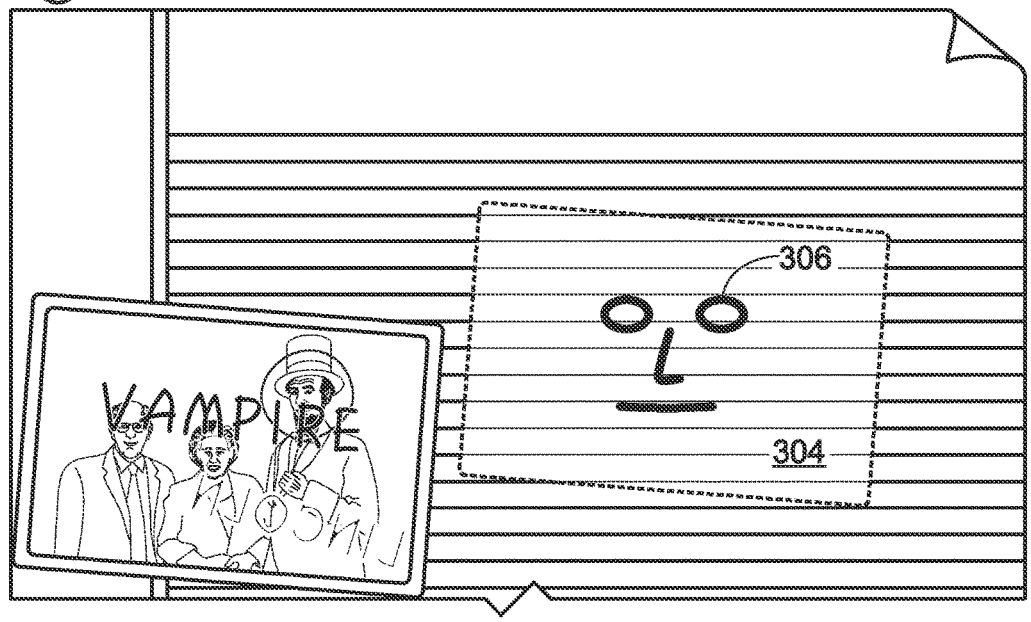

As shown in FIG. 7I, an additional region is available for annotation as a tertiary priority, comprising the occluded region 304 underneath the content. Besides "turning over" the content, moving away the content using a specialized gesture or control can reveal a bounding box, shadow, or other bounded indicator of the spatial extent of the displaced content. As long as the "turned over" content is in that state, it can be moved as desired while the original occluded region 304, here a box, remains in position, see FIG. 7J. A third feature 306, the text "beard" is associated with the occluded region 304.

Annotations made in this occluded region 304 may be assumed to have lower weighting than either the "front" of "back" annotations. Moving back the content to occlude these annotations associates them with the visible content in a manner that persists, allowing the content to be relocated while "bringing along" annotations on any of the three associated surfaces "front", "back", or "occluded".

Figure 7L:
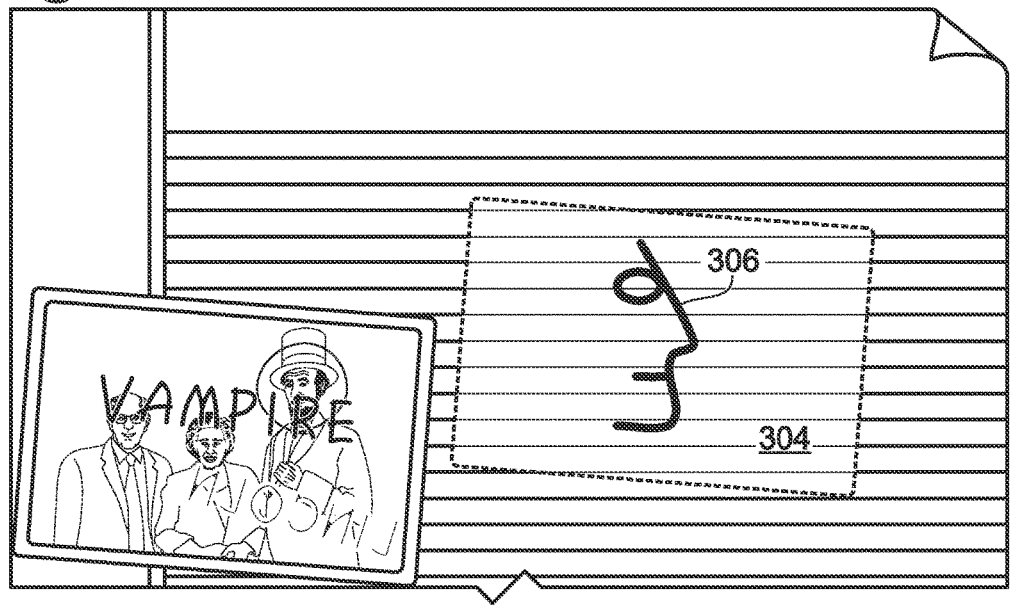
Figure 7M:
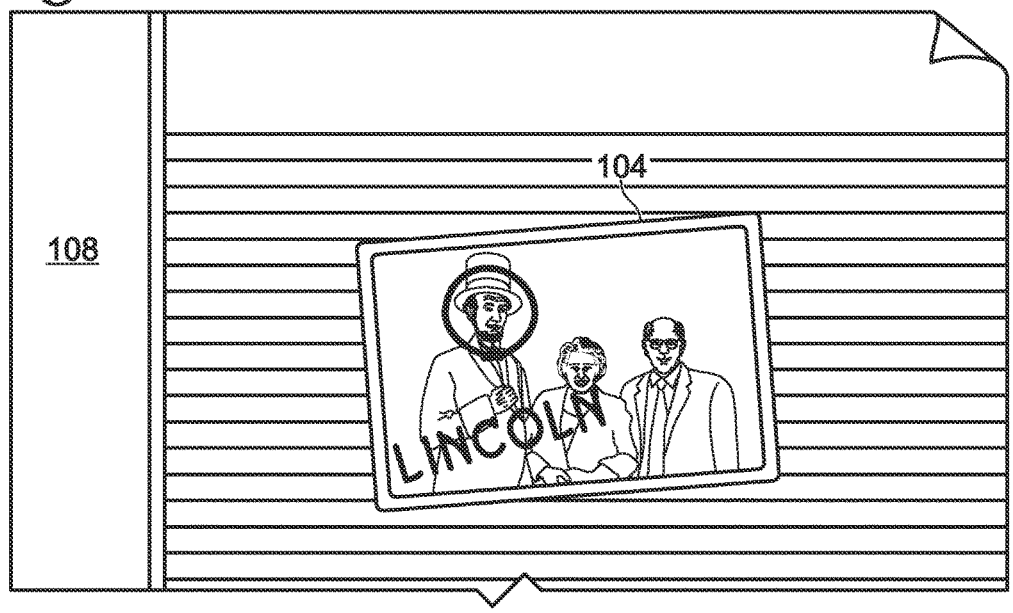

This occluded region 304 also provides a convenient blank area for sketch input (third feature 306), to provide exemplar visual content as a drawn object rather than text. For instance, to add weight to a particular pose within retrieved visual content, it would be possible to add a simple feature sketches such as the frontal view (FIG. 7K) or profile view (FIG. 7L). When the original content is "flipped" back to the front view (FIG. 7M), it is restored in position, showing only the front annotations. In this view the object is treated as normal content, and can be repositioned without revealing the "occluded" region, which is only associated with the "back" view.

To add notation to content, it is written on using digital ink (a collection of stylus stroke vectors) or by adding keyboard-entry text. The digital ink is analyzed to establish whether it is drawing—e.g., a circle or lasso line, a box, or other shape—or characters comprising text in some form. The position of the notation relative to underlying content is noted. If the underlying content is image data, the image data region bounded by a perimeter established with digital ink is extracted for further analysis. If there is no underlying content and the digital ink is classified as a drawing, the drawing may treated as an exemplar, a sketched image. In a preliminary analysis stage, if the image data is determined to be text, the image is passed to a character recognition module and a textual version returned. If the image data is determined to be pictorial or graphical, it is passed for further image analysis to extract a feature set which models the content, such as facial attributes if a face is present, edge and line attributes of a graphic with labeling to indicate a form of chart, and similar feature lists and labels.

More than one component, i.e., text and drawing, may be extracted from the digital ink and all components are spatially registered to the underlying content and supportive structures, such that a map can be created indicating the relative position of all components, both in relation to each other and the underlying content or supportive structures. From this information metadata is created to describe the relationship, such that text is ordered relative to image and other text, and the resulting ordered list determines weights to be applied for subsequent relevancy metrics associated with returned search results.

The same analysis is applied to the virtual "back" of the content, and the categorical metadata of "backside" data is also used to weight the subsequent information retrieved using this data set. Note that for an already "turned over" portion of content, the weighting of "front" versus "back" annotation is essentially reversed unless otherwise directed by a user. Once content components—original data and annotations—have been determined, the resulting metadata can be used by a query constructor module to build a search query utilizing all available data sets. Results returned by a search module may be ordered by the weights associated with each part of the data set, and presented to the user with spatial orientations derived from the inherent topology of the weights and data. In most cases this will be a centered peak with the highest aggregated weighted relevance in the center, and which falls off in a vectored manner, where direction is associated with the initial position of the weight-generating data (original, annotations) and with magnitude determined by the relevancy metrics attached to the result.

Figure 8:
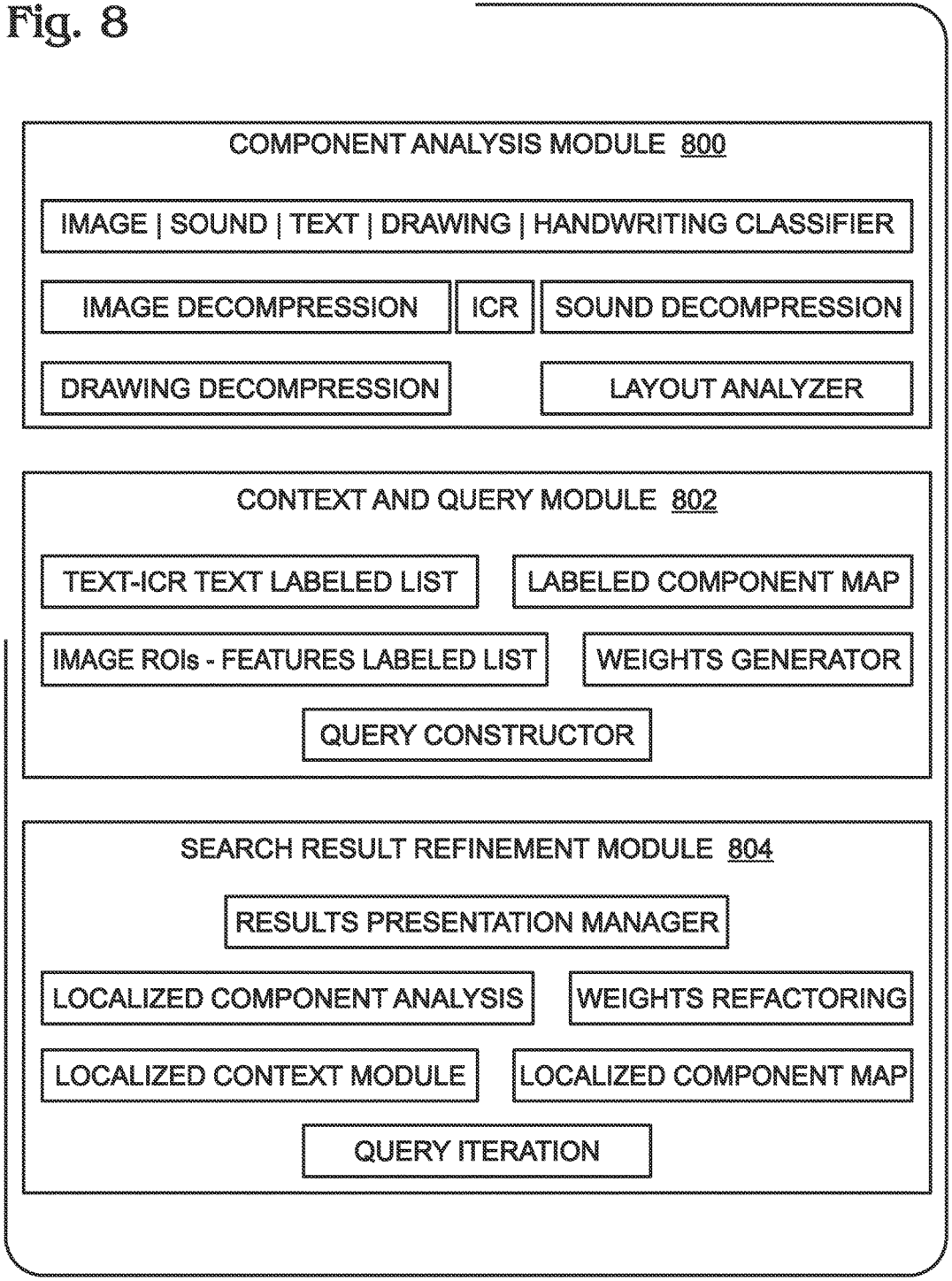
FIG. 8 is a block diagram depicting an NUI system overview.

FIG. 8 is a block diagram depicting a NUI system overview. The modules and subcomponents described herein are software or code enabled as sequences of processor instructions stored in a non-transitory memory. The component analysis module 800 comprises components for classifying between image, text, drawing, sound, and handwriting, decomposition of image, drawing, and sound, as well as intelligent character recognition (ICR) and layout analysis. The context and query module 802 includes components for generating a text-ICR labeled list, image region of interest (ROI) labeled list features, a labeled component map, weight generator, and query constructor. The search result refinement module 804 includes components for a results presentation manager, the analysis of localized components and context, the generation of a localized component map, weight refactoring, and query iteration.

FIG. 9 is a flowchart illustrating steps in an exemplary search. In Step 902 search context is invoked. In Step 904, the process determines the menu being accessed. Step 906 determines a data source. Step 908 analyzes the data. Step 910 creates metadata and associated map. Step 912 builds a query based upon the original data and metadata. Step 914 passes the query to a search engine. The results are classified in Step 916 and in Step 918 the results are structured in a map. Step 920 presents the results as organized by spatial relationship.

FIGS. 10A and 10B are flowcharts illustrating a method for formulating a search inquiry using a computer enabled with a sequence of processor executable instructions stored in a non-transitory medium. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The methods described herein may be performed by the NUI explained in FIGS. 1-4, the computer system described by FIG. 5, or the instructions explained in FIG. 6. The method starts at Step 1000.

In Step 1002 a computer user interface (UI), for example a NUI, accepts commands for selecting a first data object. The first data object may be preexisting still images, preexisting video, preexisting text documents, preexisting sounds, user-added sounds, user-added images, user-added video, user-added drawings, user-added text, or combinations of the above-listed elements. In some aspects, a plurality of first data objects is selected. In Step 1004 a computer display presents the first data object with a top plane as located within a geometric boundary representation of a virtual object-bearing front surface. In Step 1006 the computer UI accepts commands for selecting a first feature associated with the first data object. Selecting the first feature, or any of the features presented below, may be involve accentuating a preexisting aspect of the first data object, editing a previously selected feature, adding video, or adding text. The first feature may also be image-associated sounds, added sounds, or added drawings.

In Step 1008 the computer UI accepts a flip command, which may be either a flip object command or a flip surface command. In response to the flip command, in Step 1010 the computer display presents a first data object bottom plane, opposite of the first data object top plane. The first data object bottom plane is presented as a reversed first data object top plane, representing a two-dimensional first data top plane image as reversed from left to right. In Step 1012 the computer UI accepts commands for selecting a second feature associated with the first data object. In Step 1014 the computer constructs a search inquiry in response to the first data object, the first feature, and the second feature. In one aspect, Step 1014 differentially weights the first data object, first feature, and second feature. For example, the search inquiry may weigh the first data object, first feature, and second feature based upon factors such as the surface being presented when the search inquiry is initiated, the object plane being presented when the search inquiry is initiated, and a spatial analysis of first and second feature locations with respect to the first data object location. In Step 1016 the computer sends the search inquiry to a search engine.

In one aspect, Step 1008a accepts a flip surface command. Then, presenting the first data object bottom plane in Step 1010 includes presenting a geometric boundary representation of a virtual object-bearing transparent back surface, opposite of the front surface, through which the first data object bottom plane is visible. Accepting commands for selecting the second feature in Step 1012 includes associating the second feature with the first data object bottom plane.

In another aspect, Step 1008b accepts a flip object command. Then, Step 1010 presents the first data object bottom plane overlying the front surface, and Step 1012 associates the second feature with the first data object bottom plane.

In one aspect, in Step 1013a the computer UI accepts an unflip object command. In Step 1013b the computer display presents the first data object top plane as located on the front surface. Then, the method may revert back to Step 1008a, where the computer UI accepts a flip surface command, and Step 1010 presents the virtual object-hearing transparent back surface, through which the first data object bottom plane is visible. In Step 1013c the computer UI accepts commands for selecting a third feature associated with the first data object bottom surface. Alternatively, Step 1013a the computer UI accepts an unflip object command and Step 1013b the computer display presents the first data object top plane as located on the front surface, as above. But now the method reverts back to Step 1008b, where the computer UI accepts a flip object command, and Step 1010 presents the virtual object-bearing transparent back surface, through which the first data object bottom plane is visible. In Step 1013c the computer UI accepts commands for selecting a third feature associated with the first data object bottom surface.

In another aspect, in Step 1013d the computer UI accepts a shift command for relocating the first data object on the front surface. In response to the shift command, the computer display in Step 1013e presents a geometric boundary representation of a virtual object-bearing occluded surface underlying the first data object. In Step 1013f the computer UI accepting commands for adding a third feature, associated with the first data object, to the occluded surface. If a third feature was already selected in Step 1013c, then a fourth feature is selected. Then, constructing the search inquiry in Step 1014 includes constructing the search inquiry in response to the first data object, first feature, second feature, and third feature (and fourth feature, if existent).

In one aspect, in Step 1018 the computer display presents a plurality of results from the search engine in response to the search inquiry. For example, the computer display may presenting a results surface with a plurality of result objects received from the search engine in response to the search inquiry, where the relevance of a first result object is related to spatial location on the results surface and responsive to the spatial location of the first feature with respect to the first data object, and the relevance of a second result object is related to spatial location on the results surface and responsive to the spatial location of the second feature with respect to the first data object. In Step 1020 the computer accepts commands for selecting a first result, from the plurality of results, as a new first data object. Then, the method reverts to Step 1004 where the new first data object is presented on a front surface and Step 1006 where the computer UI accepts commands for selecting a new first feature associated with the new first data object.

A computer system, NUI, computer instruction set, and associated methods have been provided for preparing a search inquiry. Examples of particular commands, menus, and process steps have been presented to illustrate the invention. However, the invention is not limited to merely these examples. Other variations and embodiments of the invention will occur to those skilled in the art.

I claim:

1. A method for formulating a search inquiry using a computer enabled with a sequence of processor executable instructions stored in a non-transitory medium, the method comprising:
   a computer user interface (UI) accepting commands for selecting a first data object having a top plane image and a bottom plane image;
   a computer display displaying the first data object top plane image;
   the computer UI accepting commands for adding a first search term annotation to the presentation of the first data object top plane image;
   subsequent to adding the first search term annotation, the computer display displaying the first data object bottom plane image;
   the computer UI accepting commands for adding a second search term annotation to the presentation of the first data object bottom plane image;
   the computer constructing the search inquiry in response to the first data object top and bottom plane images, the first search term annotation, and the second search term annotation; and,
   the computer sending the search inquiry to a search engine.

2. The method of claim 1 wherein the computer displaying the first data object top plane image includes displaying a representation of a front view of a three-dimensional first data object; and,
   wherein the computer display displaying the first data object bottom plane image includes displaying a representation of a back view of the three-dimensional first data object.

3. The method of claim 2 wherein the computer display displaying the first data object top plane image includes displaying the top plane image located within a geometric boundary representation of a virtual object-bearing front surface;

wherein adding the first search term annotation to the presentation of the first data object top plane image includes adding the first search term annotation to the front surface;

the method further comprising:

subsequent to displaying the first data object top plane image, the computer UI accepting a flip surface command;

wherein presenting the first data object bottom plane image includes presenting a geometric boundary representation of a virtual object-bearing transparent back surface, opposite of the front surface, through which the first data object top plane image is visible, as reversed from left to right; and, wherein adding the second search term annotation to the presentation of the first data object bottom plane image includes adding the second search term annotation to the back surface.

4. The method of claim 2 wherein the computer display displaying the first data object top plane image includes displaying the top plane image located within a geometric boundary representation of a virtual object-bearing front surface;

wherein adding the first search term annotation to the presentation of the first data object top plane image includes adding the first search term annotation to the first data object top plane image;

the method further comprising:

prior to displaying the first data object bottom plane image, the computer UI accepting a flip object command;

wherein presenting the first data object bottom plane image includes presenting the first data object bottom plane image overlying the front surface; and, wherein adding the second search term annotation to the presentation of the first data object bottom plane image includes adding the second search term annotation to the first data object bottom plane image.

5. The method of claim 4 further comprising:

subsequent to displaying the first data object bottom plane image, the computer UI accepting an unflip object command;

the computer display representing the first data object top plane image as located on the front surface;

the computer UI accepting a flip surface command;

the computer display presenting a geometric boundary representation of a virtual object-bearing transparent back surface, opposite of the front surface, through which the first data object top plane image is visible, as reversed from left to right; and, the computer UI accepting commands for adding a third search term annotation to the first data object bottom surface.

6. The method of claim 2 wherein the computer display displaying the first data object top plane image includes displaying the top plane image located within a geometric boundary representation of a virtual object-bearing front surface;

the method further comprising:

the computer UI accepting a shift command for relocating the first data object on the front surface;

in response to the shift command, the computer display presenting a geometric boundary representation of a virtual object-bearing occluded surface underlying the first data object;

the computer UI accepting commands for adding a third search term annotation to the occluded surface of the first data object; and, wherein the computer constructing the search inquiry includes constructing the search inquiry in response to the first data object top and bottom plane images, first search term annotation, second search term annotation, and third search term annotation.

7. The method of claim 1 wherein the computer constructing the search inquiry includes the computer differentially weighting the first data object top and bottom plane images, first search term annotation, and second search term annotation.

8. The method of claim 1 wherein the computer UI accepting commands for selecting the first data object includes the first data object being selected from a group consisting of preexisting still images, preexisting video, preexisting text documents, preexisting sounds, user-added sounds, user-added images, user-added video, user-added drawings, user-added text, and combinations of the above-listed elements.

9. The method of claim 1 further comprising:

the computer display presenting a plurality of results from the search engine in response to the search inquiry;

the computer accepting commands for selecting a first result, from the plurality of results, as a new first data object; and, the computer UI accepting commands for adding a new first search term annotation to the new first data object.

10. The method of claim 1 wherein the computer UI accepting commands for adding the first search term annotation to the presentation of the first data object top plane image includes accepting commands for adding a plurality of search term annotations.

11. The method of claim 1 wherein the computer constructing the search inquiry includes weighting the first data object top and bottom plane images, first search term annotation, and second search term annotation based upon factors selected from a group consisting of a virtual object-bearing surface being presented when the search inquiry is initiated, the first data object plane image being presented when the search inquiry is initiated, a spatial analysis of the first search term annotation location with respect to the first data object top plane image location, and a spatial analysis of the second search term annotation with respect to the first data object bottom plane image location.

12. The method of claim 1 wherein the computer UI accepting commands for adding the first search term annotation to the presentation of the first data object top plane image includes adding the first search term annotation from a group consisting of accentuating a preexisting aspect of the first data object top plane image, adding video, adding text, image-associated sounds, adding sounds, adding drawings, and editing a previously added search term annotation.

13. The method of claim 1 further comprising:

the computer display presenting a results surface with a plurality of result objects received from the search engine in response to the search inquiry, where the relevance of a first result object is related to spatial location on the results surface and responsive to the spatial location of the first search term annotation with respect to the first data object top plane image, and the relevance of a second result object is related to spatial location on the results surface and responsive to the spatial location of the second search term annotation with respect to the first data object bottom plane image.

14. The method of claim 1 wherein accepting commands for selecting the first data object includes accepting commands for selecting a plurality of first data objects.

15. A search inquiry natural user interface (NUI) enabled by a computer executing a sequence of processor instructions stored in a non-transitory medium, the NUI comprising:
a front page menu providing user interface (UI) mechanisms for:
selecting a first data object having both a top plane image and a bottom plane image;
displaying the first data object top plane image;
adding a first search term annotation to the display of the first data object top plane image;
initiating a search inquiry;
accepting a flip command;
a flip page menu, presented in response to the flip command, displaying the first data object bottom plane image, and providing UI mechanisms for:
adding a second search term annotation to the display of the first data object bottom plane image;
initiating a search inquiry;
accepting an unflip command for returning to the front page menu; and,
wherein the search inquiries are responsive to the first data object top and bottom plane images, the first search term annotation, and the second search term annotation.

16. The NUI of claim 15 wherein the first data object top plane image is presented as a representation of a front view of a three-dimensional first data object; and,
wherein the first data object bottom plane image is presented as a representation of a back view of the three-dimensional first data object.

17. The NUI of claim 16 wherein the front page menu presents the first data object top plane image as located within a geometrical boundary representation of a virtual object-bearing front surface, and wherein the first search term annotation is added to the front surface;
wherein the flip command is a flip surface command;
wherein the flip page menu is a flip surface menu presenting a geometric boundary representation of a virtual object-bearing transparent back surface, opposite of the front surface, through which the first data object top plane image is visible as reversed from left to right, in response to the flip surface command; and,
wherein the second search term annotation is added to the back surface.

18. The NUI of claim 16 wherein the front page menu presents the first data object top plane image as located within a geometrical boundary representation of a virtual object-bearing front surface, and wherein the first search term annotation is added to the first data object top plane image;
wherein the flip command is a flip object command; and,
wherein the flip page menu is a flip object menu presenting the first data object bottom plane image overlying the front surface in response to the flip object command, and wherein the second search term annotation is added to the first data object bottom plane image.

19. The NUI of claim 18 wherein, subsequent to presenting the first data object bottom plane image, the flip object menu UI mechanism accepts an unflip command;
wherein the front page menu represents the first data object top plane image as located on the front surface and accepts a flip surface command;
wherein a flip surface menu presents a geometric boundary representation of a virtual object-bearing transparent back surface, opposite of the front surface, through which the first data object bottom plane image is visible, in response to the flip surface command; and,
wherein the flip surface menu further comprises a UI mechanism for adding a third search term annotation to the first data object back surface.

20. The NUI of claim 16 wherein the front page menu presents the first data object top plane image as located within a geometrical boundary representation of a virtual object-bearing front surface;
wherein the front page menu further comprises a UI mechanism for accepting a shift command to relocate the first data object on the front surface and presents a geometric boundary representation of a virtual object-bearing occluded surface underlying the first data object;
the NUI further comprising:
a shift object menu comprising a UI mechanism for accepting commands to add a third search term annotation to the occluded surface of the first data object; and,
wherein a shift object menu search inquiry UI mechanism initiates a search inquiry in response to the first data object top and bottom plane images, first search term annotation, second search term annotation, and third search term annotation.

21. The NUI of claim 15 wherein the front page and flip page menu search inquiry UI mechanisms initiate search inquiries by differentially weighting the first data object top and bottom plane images, first search term annotation, and second search term annotation.

22. The NUI of claim 15 wherein the front page menu UI mechanism accepts commands for selecting the first data object from a group consisting of preexisting still images, preexisting video, preexisting text documents, preexisting sounds, user-added sounds, user-added images, user-added video, user-added drawings, user-added text, and combinations of the above-listed elements.

23. The NUI of claim 15 further comprising:
a results menu presenting a plurality of result objects received in response to the search inquiry, and providing UI mechanisms for:
selecting a first result object, from the plurality of result objects, as a new first data object; and,
adding a new first search term annotation to the new first data object.

24. The NUI of claim 15 wherein the front page menu UI mechanism accepts commands for adding a plurality of search term annotations to the display of the first data object top plane image.

25. The NUI of claim 15 wherein the front page and flip page menu search inquiry UI mechanisms initiate search inquiries by weighting the first data object top and bottom plane images, first search term annotation, and second search term annotation based upon factors selected from a group consisting of a virtual object-bearing surface being presented when the search inquiry is initiated, the first data object plane image being presented when the search inquiry is initiated, a spatial analysis of the first search term annotation location with respect to the first data object top plane image location, and a spatial analysis of the second search term annotation location with respect to first data object bottom plane location.

26. The NUI of claim 15 wherein the front page menu UI mechanism accepts commands for adding the first search term annotation from a group consisting of accentuating a preexisting aspect of the first data object top plane image, adding video, adding text, image-associated sounds, adding sounds, adding drawings, and editing a previously selected search term annotation.

27. The NUI of claim 15 further comprising:
a results menu for presenting a results surface with a plurality of result objects received in response to the search inquiry, where the relevance of a first result object is related to spatial location on the results surface and responsive to the spatial location of the first search term annotation with respect to the first data object top plane image, and the relevance of a second result object is related to spatial location on the results surface and responsive to the spatial location of the second search term annotation with respect to the first data object bottom plane image.

28. The NUI of claim 15 wherein the front page menu UI mechanism accepts commands for selecting a plurality of first data objects.

29. A non-transitory computer-readable media for formulating a search inquiry comprising computer-readable instructions recorded thereon for:
accepting user interface (UI) commands for selecting a first data object having both a top plane image and a bottom plane image;
displaying the first data object top plane image;
accepting UI commands for adding a first search term annotation to the display of the first data object top plane image;
accepting a UI flip command;
in response to the flip command, displaying the first data object bottom plane image;
accepting UI commands for adding a second search term annotation to the display of the first data object bottom plane image;
constructing a search inquiry in response to the first data object top and bottom plane images, the first search term annotation, and the second search term annotation; and,
sending the search inquiry to a search engine.

30. An electronic device for formulating a search inquiry comprising:
a processor;
a search inquiry application enabled with a sequence of processor executable instructions stored in a non-transitory medium;
a user interface (UI) accepting UI commands;
a display;
wherein the search inquiry application accepts UI commands for selecting a first data object having both a top plane image and a bottom plane image;
wherein the search inquiry application accepts UI commands for adding a first search term annotation to the display of the first data object top plane image, and subsequently displaying the first data object bottom plane image; and,
wherein the search inquiry application accepts UI commands for adding a second search term annotation to the display of the first data object bottom plane image, constructs a search inquiry in response to the first data object top and bottom plane images, the first search term annotation, and the second search term annotation, and sends the search inquiry to a search engine.

* * * * *